United States Patent [19]

Phillips

[11] Patent Number: 5,249,420

[45] Date of Patent: Oct. 5, 1993

[54] CONTROL VALVE FOR BOOTSTRAP HYDRAULIC SYSTEMS

[75] Inventor: Edwards H. Phillips, Troy, Mich.

[73] Assignee: Techco Corporation, Troy, Mich.

[21] Appl. No.: 826,901

[22] Filed: Jan. 24, 1992

Related U.S. Application Data

[63] Continuation-in-part of Ser. No. 774,055, Oct. 7, 1991, which is a continuation-in-part of Ser. No. 743,243, Aug. 9, 1991, which is a continuation-in-part of Ser. No. 698,601, May 10, 1991.

[51] Int. Cl.$^5$ ............................................... F16D 31/02
[52] U.S. Cl. ........................................ 60/392; 60/450; 60/468; 91/375 A
[58] Field of Search .................. 60/392, 393, 431, 450, 60/451, 468, 494; 91/375 R, 375 A, 437

[56] References Cited

U.S. PATENT DOCUMENTS

| | | | |
|---|---|---|---|
| 2,407,812 | 9/1946 | Cain | 91/375 R |
| 4,217,932 | 8/1980 | Bacardit | 91/375 R |
| 4,417,640 | 11/1983 | Abe et al. | 60/468 |
| 4,425,759 | 1/1984 | Krusche | |
| 4,924,910 | 5/1990 | Tabata et al. | |

Primary Examiner—Edward K. Look
Assistant Examiner—F. Daniel Lopez
Attorney, Agent, or Firm—Gifford, Groh, Sprinkle, Patmore and Anderson

[57] ABSTRACT

The present invention is directed to a hydro-mechanical or electro-hydro-mechanical control system utilized for positioning a mechanical device. The control system incorporates an improved closed-center control valve for selectively controlling the differential pressure applied to the input ports of a power output transducer and the differential flow therebetween in response to a mechanically applied rotational input. The power output transducer is then utilized to position a mechanical device. The control system is a closed loop circuit adapted to supply hydraulic fluid at a desired supply pressure to the control valve. The improved closed-center control valve is a modified rotary valve wherein parasitic leakage slots are formed for providing a leakage flow pathway through the control valve between the input ports of the power output transducer.

20 Claims, 21 Drawing Sheets

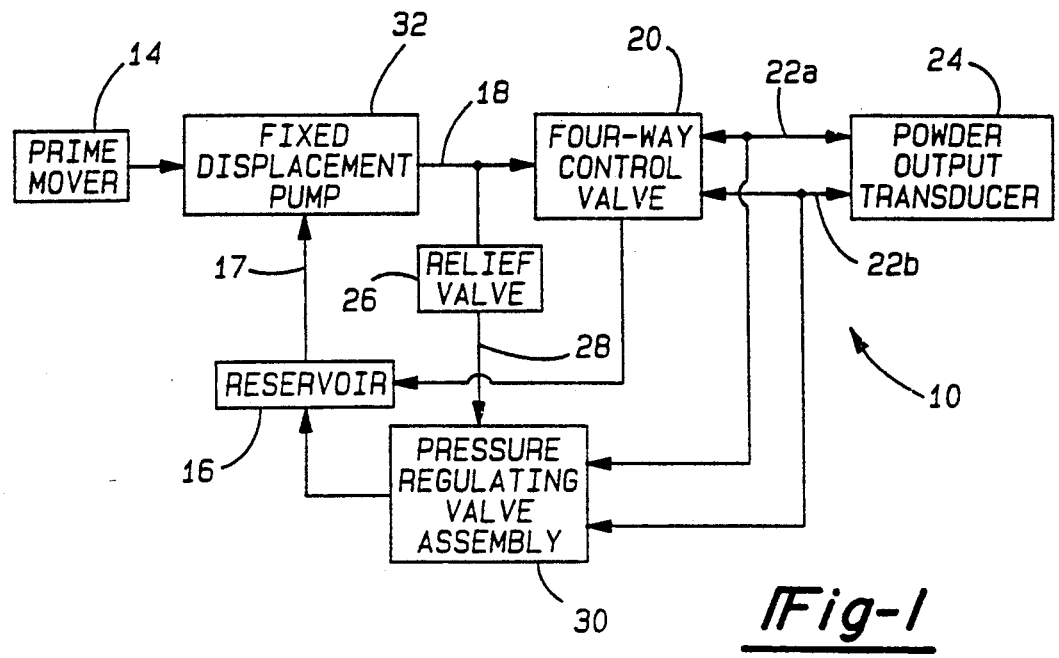
_Fig-1_
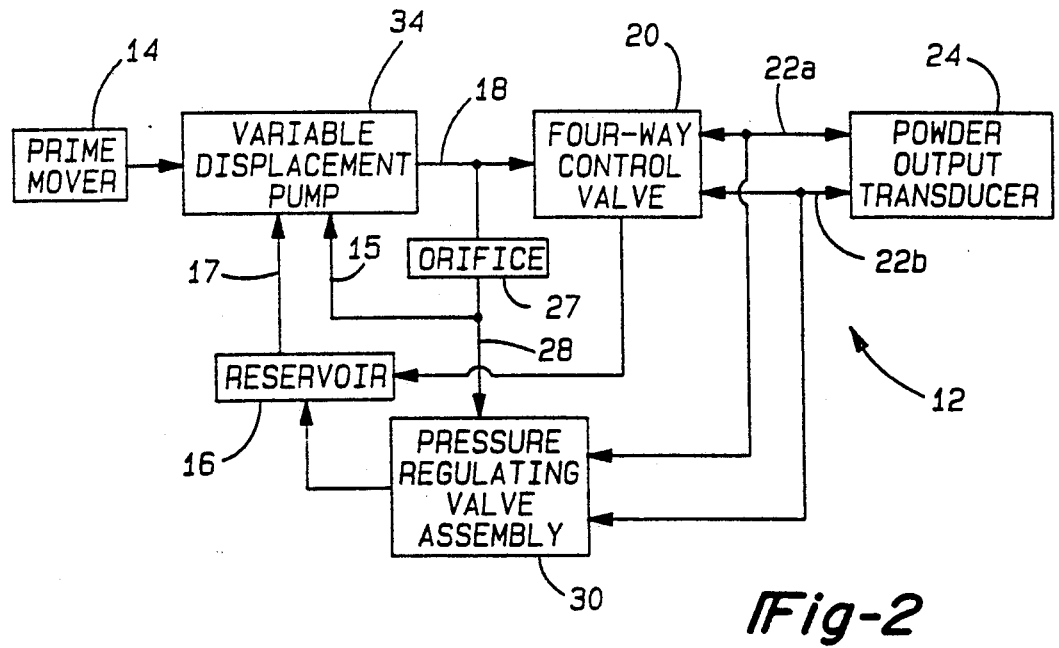
_Fig-2_

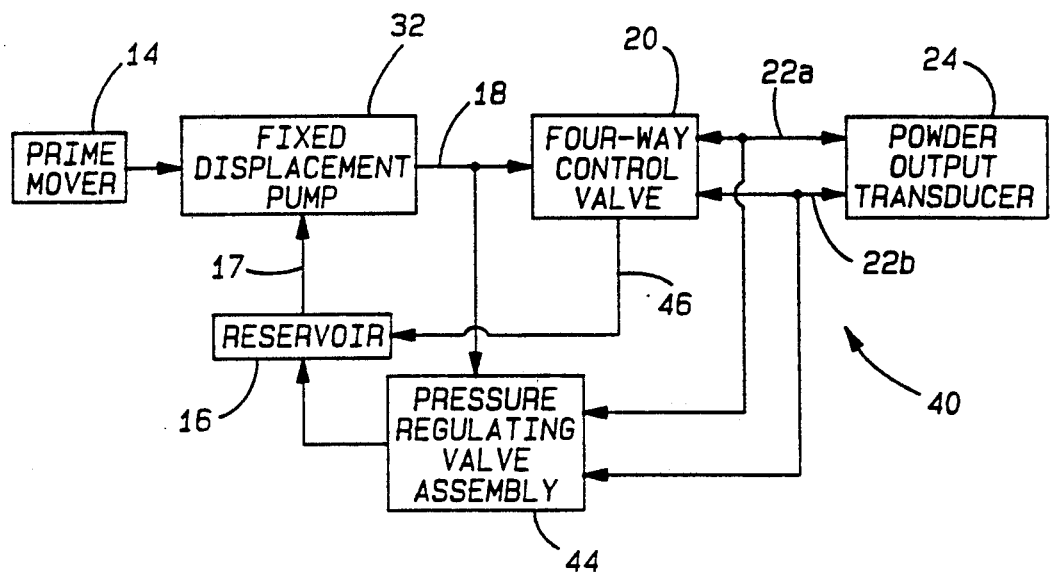
_Fig-3_
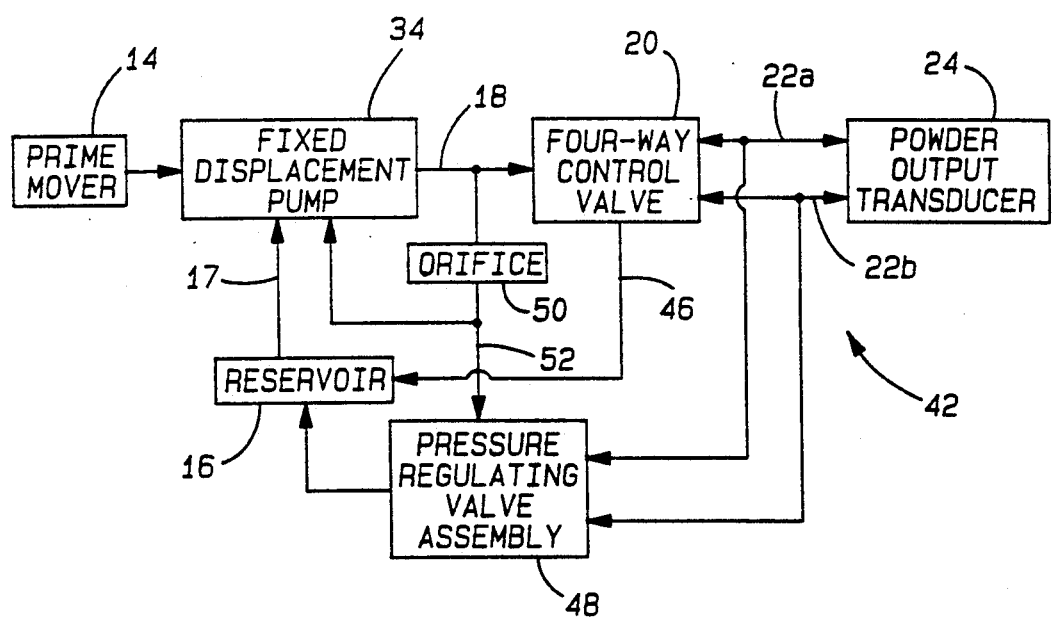
_Fig-4_

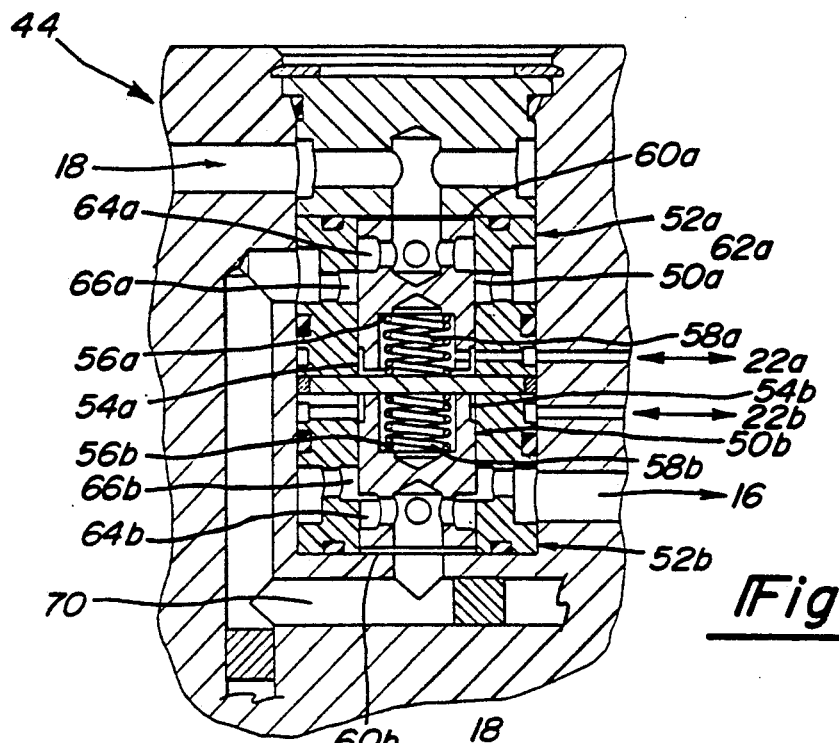
*Fig-5*
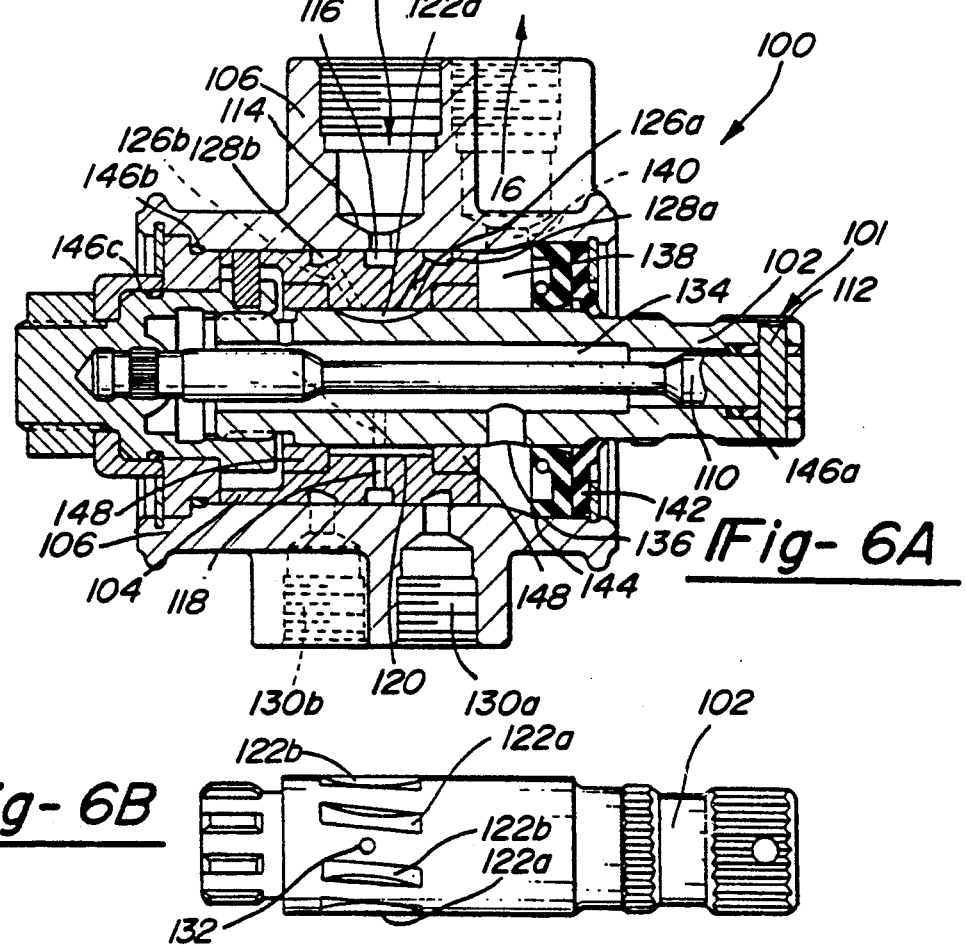
*Fig-6A*
*Fig-6B*

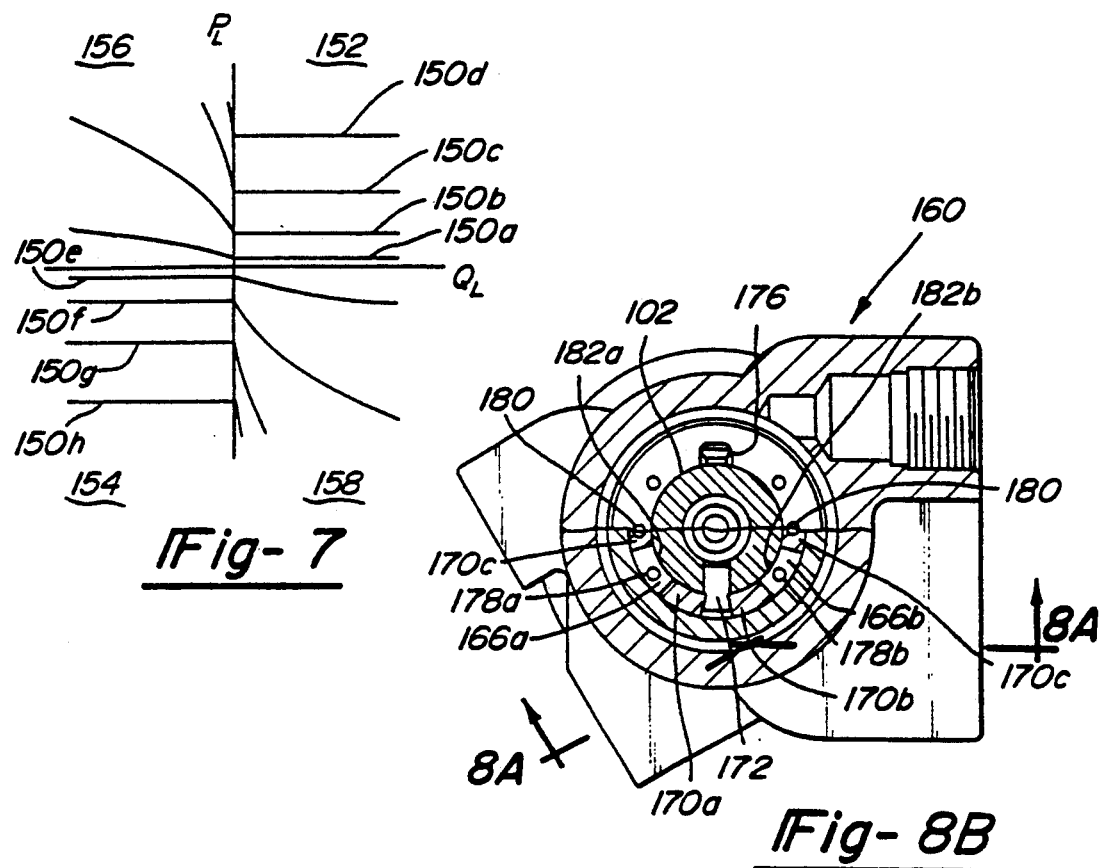
Fig-7
Fig-8B
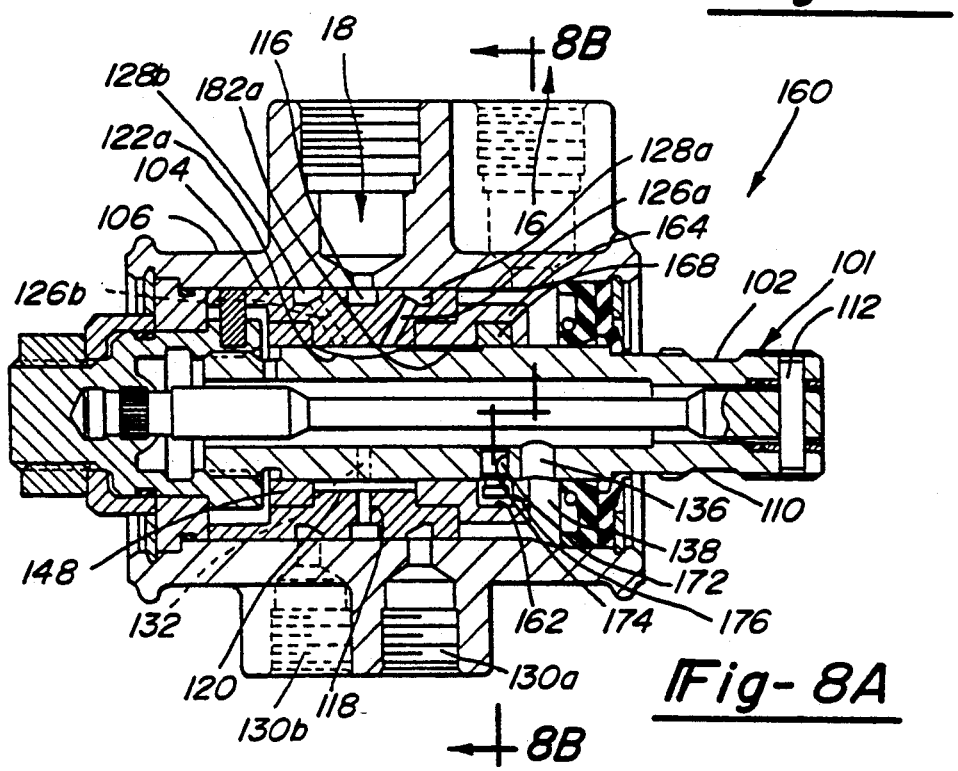
Fig-8A

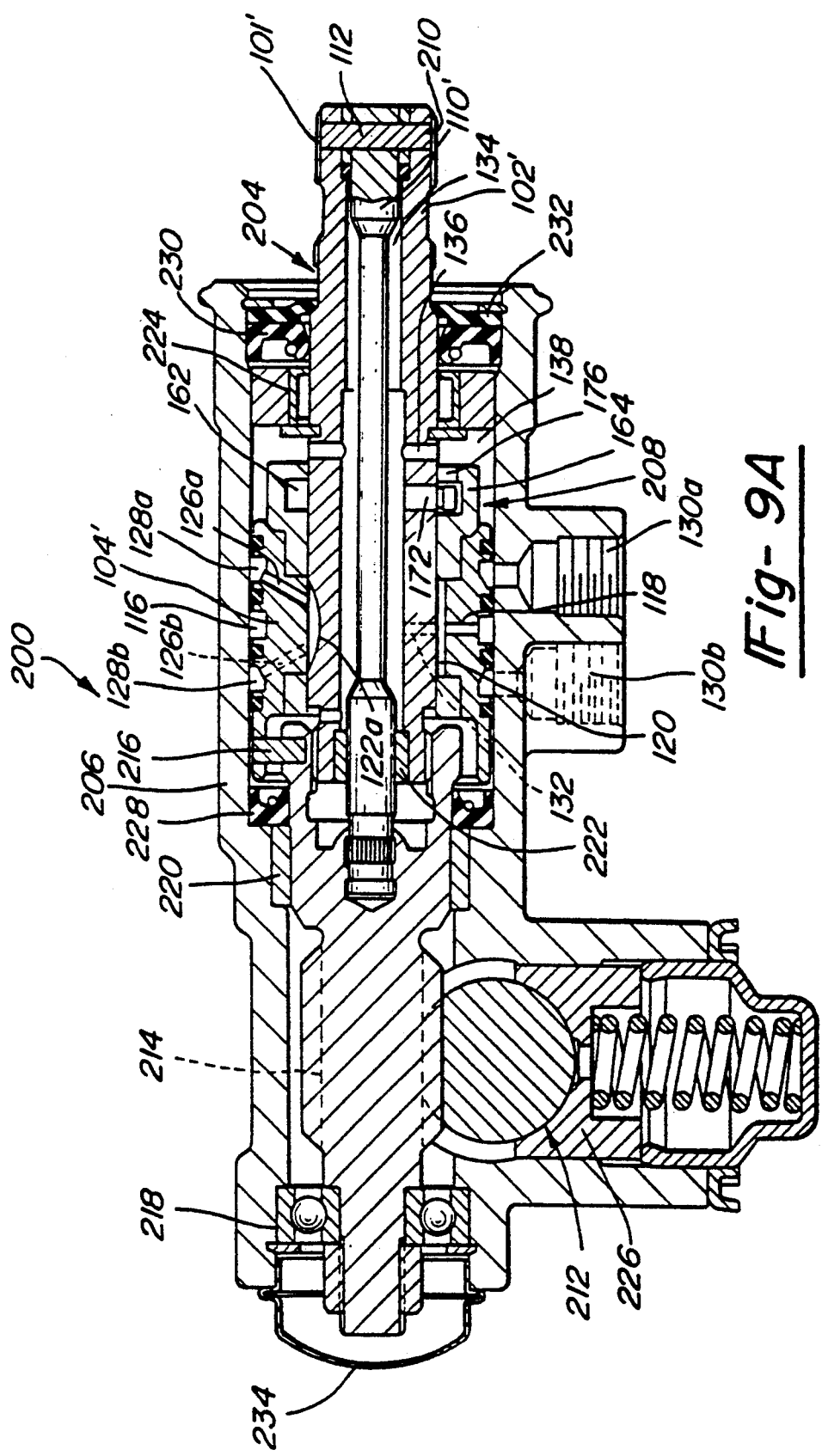

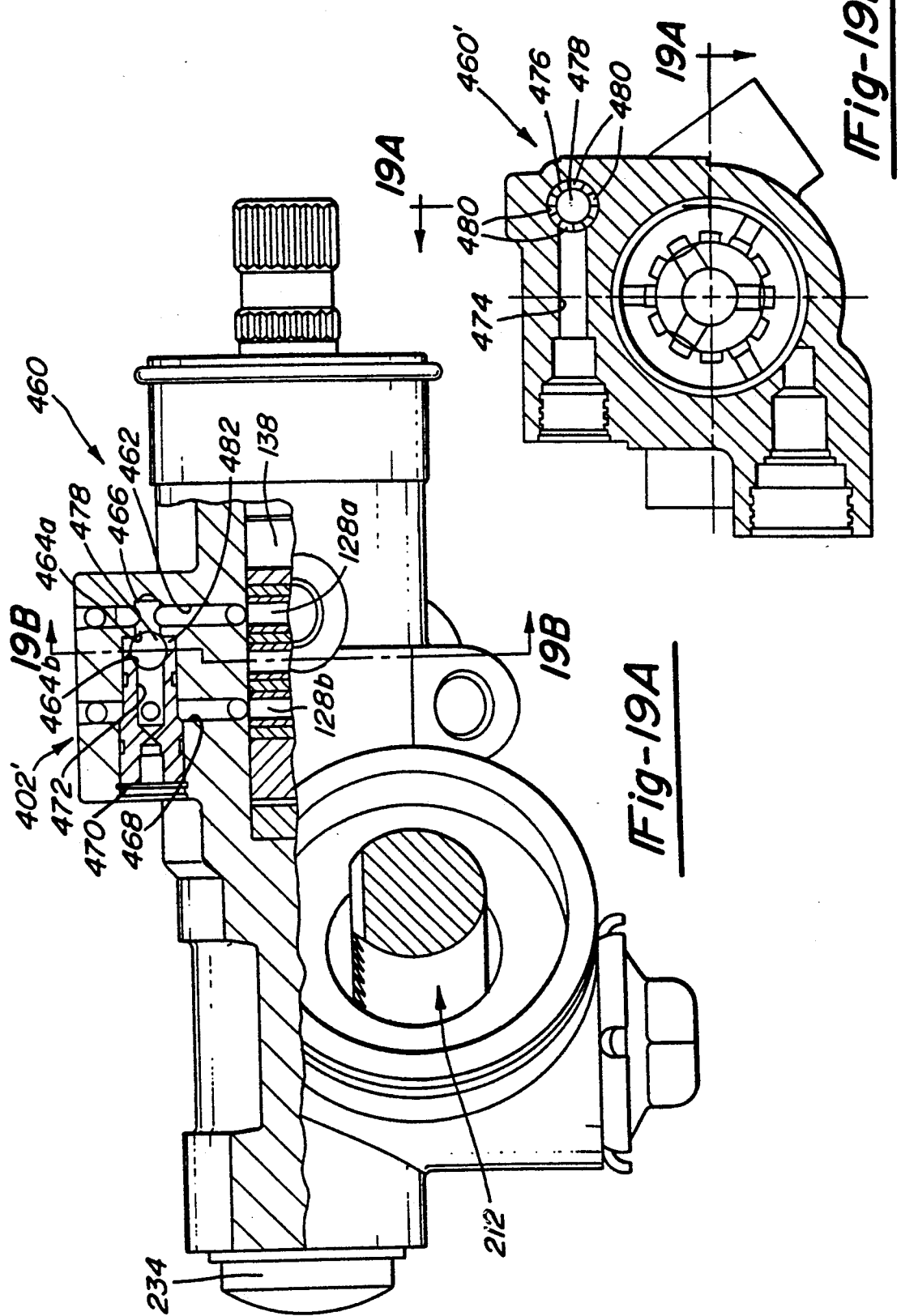

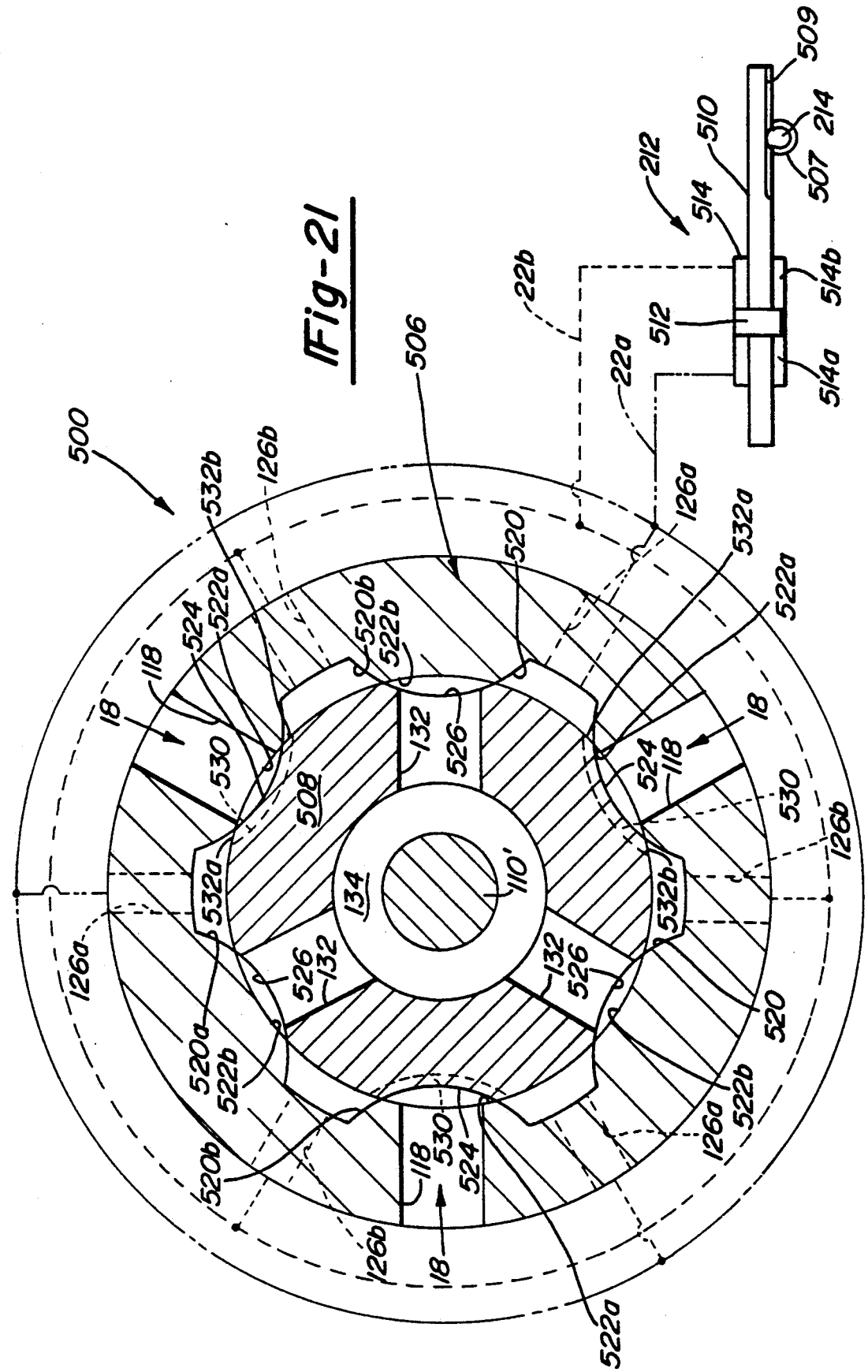

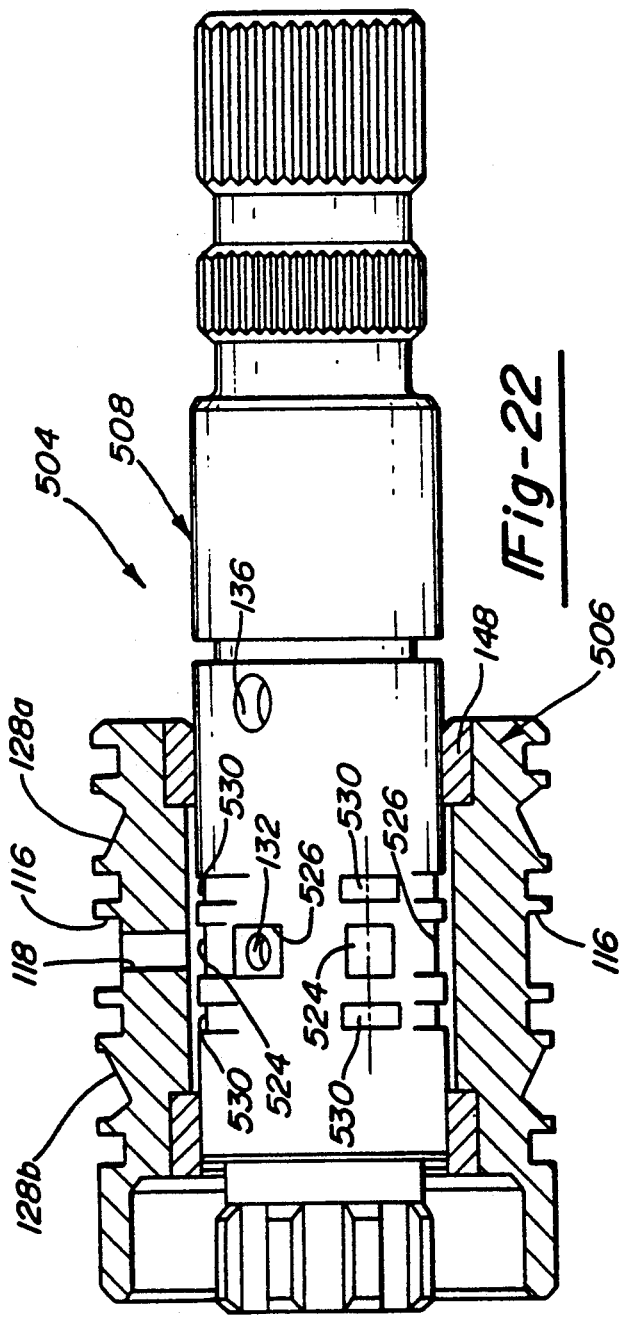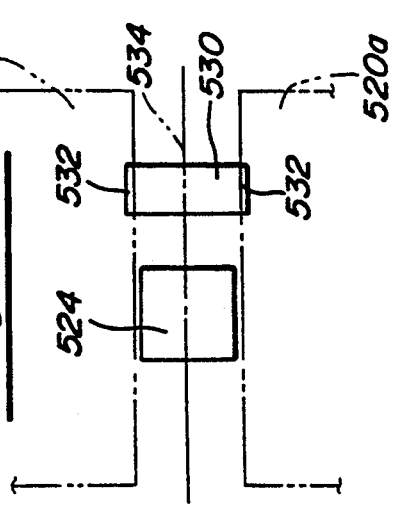

CONTROL VALVE FOR BOOTSTRAP HYDRAULIC SYSTEMS

CROSS-REFERENCE TO RELATED APPLICATIONS

The present application is a continuation-in-part of U.S. Ser. No. 07/774,055 filed Oct. 7, 1991 which is a continuation-in-part of U.S. Ser. No. 07/743,243 filed Aug. 9, 1991 which is a continuation-in-part of U.S. Ser. No. 07/698,601 filed May 10, 1991.

BACKGROUND AND SUMMARY OF THE INVENTION

The present invention relates generally to hydro-mechanical and electro-hydro-mechanical systems commonly utilized for positioning mechanical objects (which complete systems will hereinafter be called "control systems").

Most control systems typically utilize a control valve for selectively controlling the application of pressurized hydraulic fluid to the input ports of a power output transducer. The power output transducer is operable for positioning the mechanical objects in response to the pressurized hydraulic fluid acting thereon. In addition, control systems often include feedback elements which are used for establishing a "reference" position for the control valve in order to form a closed-loop servo system. Conventional control systems generally include a pumping apparatus for supplying the pressurized hydraulic fluid at either a substantially constant pressure (hereinafter called "constant pressure systems") or a substantially constant flow rate (hereinafter called "constant flow systems").

Constant pressure systems are the most common. The control valves in constant pressure systems are utilized to control hydraulic fluid flow (hereinafter "load flow") to the input ports of the power output transducers. If the control valve of a constant pressure system is zero-lapped then only leakage amounts of hydraulic fluid will be consumed whenever the control valve is centered. Furthermore, if the constant pressure system includes a feedback element for establishing a reference position for the control valve, then the constant pressure system will achieve its final position, with respect to the reference position, substantially without error.

Constant flow systems are typically utilized for vehicular power steering systems. Control valves utilized in such power steering systems are severely under-lapped (i.e., having an open-center configuration) in order to provide passage of the hydraulic fluid without generating an objectionable parasitic pressure loss. This permits the utilization of simple constant displacement pumps with concomitantly minimized average power consumption. However, this also typically results in control characteristics wherein valve deflection primarily regulates load pressure rather than load flow. Furthermore, the load pressure is generally highly nonlinear with respect to valve deflection U.S. Pat. No. 4,460,016 entitled Rotary Servo valve by Haga et al, issued Jul. 17, 1984 discloses the various factors relating to these control characteristics. Thus, such control systems are typically subject to large position error even under relatively light steering loads.

The performance characteristics associated with most conventional vehicular power steering systems substantially conform to a "servo system" of the type subject to a fixed value of steady state position error and a nominally undefined velocity error in response to steady state loads. Alternatively, it is desirable to configure a vehicular power steering system as a servo system having zero position error and a fixed value of velocity error when subjected to steady state loads. In any case, the result (with rotary valve equipped power steering systems) is often a feeling of "play" with concomitant "wander" of a host vehicle when the vehicle is subject to transient load conditions (i.e., such as intermittent side winds or uneven road surfaces).

For this reason some vehicular power steering systems incorporate mechanically interlocking over-ride mechanisms whereby direct coupled manual steering is engaged at light steering loads. However, even such vehicular power steering systems have degraded road feel when compared to manual steering systems. This is because of the parasitic drag associated with various components (i.e., hydraulic power cylinder, seals and the like) and a highly non-linear transition from manual steering to power assisted steering at a selected value of steering load.

Accordingly, the present invention is directed to various control systems having a pumping apparatus which supplies pressurized hydraulic fluid at variable pressures that are selectably related to load pressure. In a first series of embodiments, a pressure regulating valve assembly is used to selectively by-pass excess hydraulic fluid flow from a pump. This is done in a manner which develops a supply pressure that nominally obeys the equation:

$$P_s = K_1 |P_L| + \Delta P$$

where $P_s$ is the supply pressure, $|P_L|$ is the absolute value of load pressure, K is a selected proportionality factor (whose value is usually selected to be 1.0 or very slightly higher in order to compensate for the effects of system leakage and losses) and $\Delta P$ is a desired minimum value of $P_s$ present at a zero value of $p_L$. Thus, the pressure drop through the control valve is maintained at a nominally constant value equal to the difference between the supply pressure and the absolute value of the load pressure.

As will be described below, the nominally constant pressure drop across the control valve results in a more nearly constant, or "stiffer", control valve flow control characteristic with respect to changes in load pressure. In this regard it is similar to a positive feedback technique commonly called "bootstrapping" which is utilized to "stiffen" the output voltage of electronic amplifiers. Because of functional similarity between the bootstrap electronic amplification technique and the control systems to be described hereinbelow, control systems having the pumping apparatus supplying pressurized hydraulic fluid at variable pressures that are selectably related to load pressure will hereinafter be called "bootstrap control systems". Moreover, bootstrap control systems which use a pressure regulating valve assembly to selectively by-pass excess hydraulic fluid are hereinafter referenced to as "by-pass bootstrap systems".

In a second series of embodiments, the pressure regulating valve assembly, as modified for significantly lower flow, is utilized for selectively controlling the volumetric output of a variable displacement pumping apparatus, with these control systems hereinafter being called "regulated bootstrap systems". This is done in a manner whereby the supply pressure substantially obeys the above equation, and concomitantly, load flow is substantially matched by pump volumetric output.

By-pass and regulated bootstrap systems often incorporate control valves that are zero-lapped or over-lapped (i.e., "closed-center") such that valve leakage is minimal. Since supply pressure is virtually always maintained at a minimum level necessary for control valve function in a bootstrap control system, efficiency is substantially improved when compared to a conventional constant pressure system. In fact, efficiencies in a regulated bootstrap system can even approach those commonly associated with pulse-width modulated electronic servo systems.

Since the difference between the supply pressure and the load pressure is nominally constant regardless of the load value (for positive loads), constant load flow can be substantially maintained without changing the valve opening. Therefore, the value of the error signal is substantially a function of control system output velocity. Thus, in "bootstrap" systems the error signal does not suffer modulation in the face of changing control system load values.

Another feature of the present invention, an improved four-way control valve, is disclosed which can be utilized in the aforementioned bootstrap control systems. The improved four-way control valve features "zero-lapped" or slightly "over-lapped" control orifices (i.e., it is a "closed-center" four-way control valve). Because of its closed-center design, valve deflection of the four-way control valve is primarily determined by load flow rather than load pressure. A primary benefit gained thereby is nominally zero valve deflection for any static load, even when used in constant flow bootstrap systems. Thus, when such constant flow bootstrap systems are incorporated into closed-loop servo systems, the resulting performance substantially conforms to that of the second type of servo system mentioned above.

When the improved four-way control valve of the present invention is utilized in a vehicular power steering system, the primary tactile feedback is related to steering wheel rotational velocity as opposed to steering force. Such tactile feedback can be thought of as "negative rate" feedback. Looked at another way, this primary steering characteristic is actually a positive real value of steering impedance as determined by steering wheel torque divided by steering wheel velocity. This novel steering characteristic is desirable because of its fundamentally stable feel as opposed to a "spring-like" feel (i.e., a negative imaginary value of steering impedance) present with many rotary valve equipped power steering systems.

Accordingly, the present invention is also directed to vehicular power steering systems which overcome the disadvantages associated with convention power steering system via utilization of bootstrap control systems. As such, a first preferred power steering system described herein is a hydro-mechanical power steering system wherein a by-pass bootstrap system is utilized. Yet, another preferred power steering system comprises an electrically powered vehicular power steering system wherein a regulated bootstrap system is utilized. In the electrically powered vehicular power steering system, a controller provides an electrical power signal to a motor driven pump in order to selectively control volumetric hydraulic fluid output.

According to yet another feature of the present invention, an improved "closed-center" four-way control valve is disclosed which can be utilized with virtually any of the various aforementioned bootstrap control systems. The improved four-way control valve is a modified rotary valve having "zero-lapped" or slightly "over-lapped" control orifices. In addition, a plurality of leakage slots are formed in parallel with the main flow distributing slots on the valve spool. The circumferential width of the leakage slots is slightly larger than the circumferential width of the main slots. As such, the leakage slots provide a fluid leakage path between the valve sleeve output slots when the valve spool is rotationally "centered" relative to the valve sleeve. The leakage flow is effective in modifying the characteristic curve of the "closed-center" control valve to nominally provide "open-center" valve characteristics while concomitantly preserving the significant power consumption advantages associated with closed-center four-way control valves.

As a related object, the improved "closed-center" four-way control valve is readily adapted for use in the various hydro-mechanical and electrically powered vehicular power steering systems of the present invention.

Other features, objects and advantages of the present invention will become readily apparent to one skilled in the art upon analysis of the following written description taken in conjunction with the accompanying drawings and appended claims.

BRIEF DESCRIPTION OF THE DRAWINGS

FIG. 1 is a block diagram of a hydro-mechanical by-pass bootstrap system according to the present invention;

FIG. 2 is a block diagram of a hydro-mechanical regulated bootstrap system according to the present invention;

FIG. 3 is a block diagram of a simplified by-pass bootstrap system according to the present invention;

FIG. 4 is a block diagram which depicts a simplified regulated bootstrap system according to the present invention;

FIG. 5 is a sectional view of an exemplary pressure regulating valve assembly which can be used with the simplified by-pass and regulated bootstrap systems of FIGS. 3 and 4, respectively;

FIGS. 6A and 6B illustrate a balanced "closed-center" four-way control valve wherein the area of the control orifices increases quadratically as a function of valve deflection;

FIG. 7 is a graph of the pressure vs. flow curves illustrating the hydraulic performance of the various bootstrap systems of the present invention;

FIGS. 8A and 8B are sectional views of a reaction torque device which can be incorporated into the balanced four-way control valve of FIG. 6A;

FIGS. 9A through 9D are various views showing a vehicular power steering control apparatus which incorporates the pressure regulating valve assembly, the balanced four-way control valve and the reaction torque device of the present invention;

FIG. 19A and 19B are sectional views of a modified power steering control apparatus operable for use in the bootstrap power steering system shown in FIG. 15;

FIG. 21 is an enlarged sectional view of the improved four-way control valve shown in FIG. 20;

FIG. 22 is a view of an improved valving sub-assembly associated with the vehicular power steering control apparatus of FIG. 20 and illustrating a first embodiment of the leakage slots formed in the valve spool;

FIGS. 23A through 23C depict various alternative configurations for the leakage slots shown in FIG. 21;

DETAILED DESCRIPTION OF THE PREFERRED EMBODIMENTS

Figure 9B:
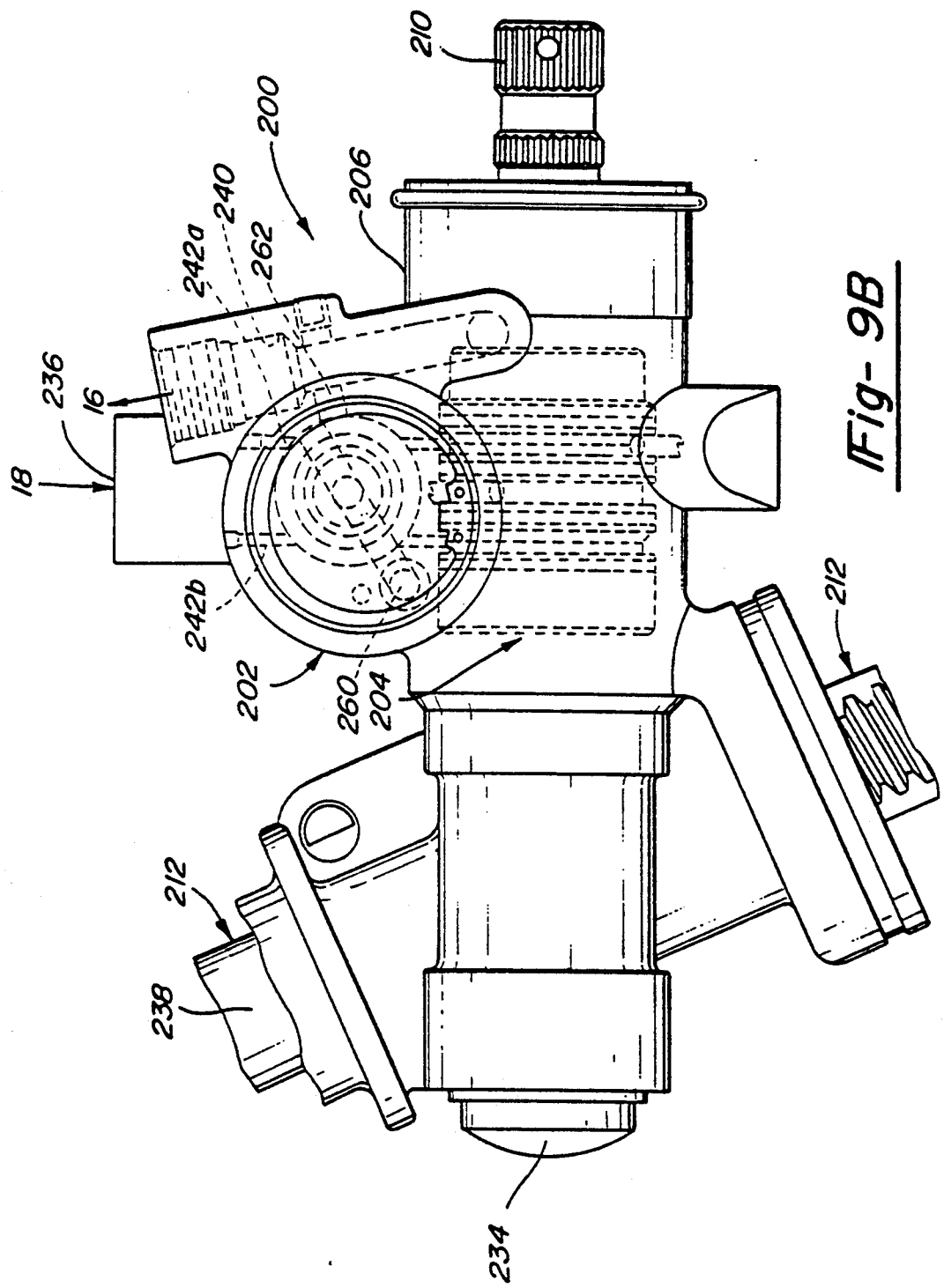
Figure 9C:
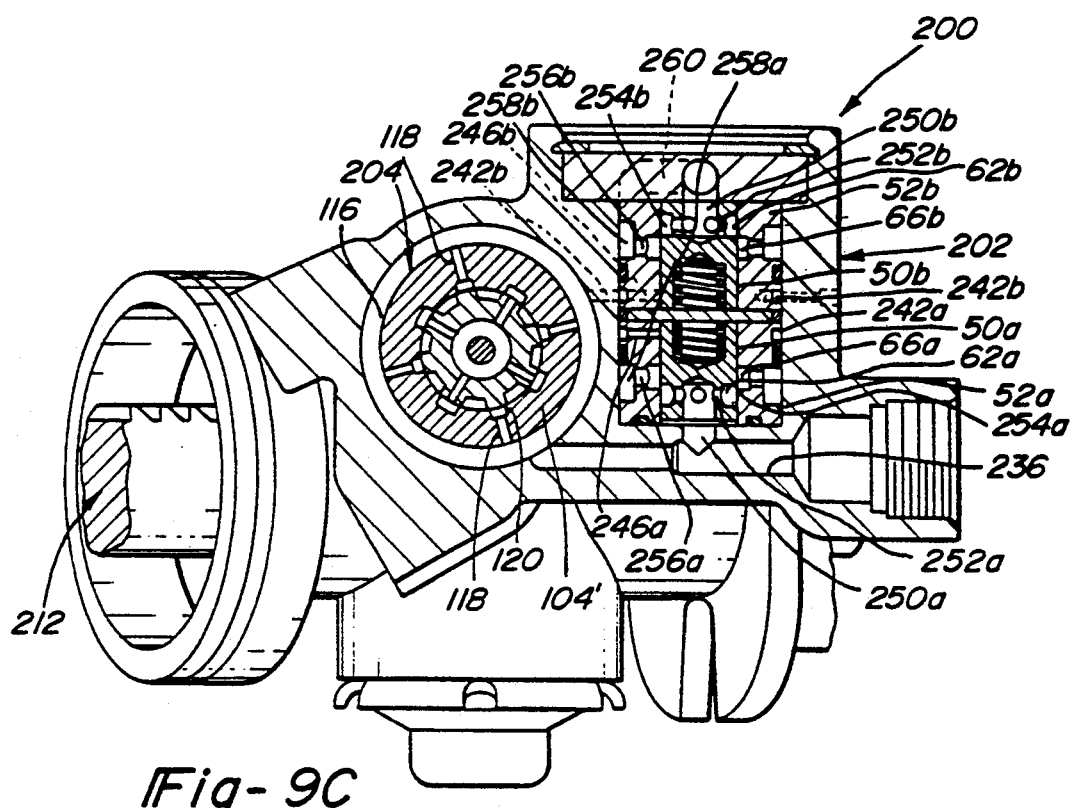
Figure 9D:
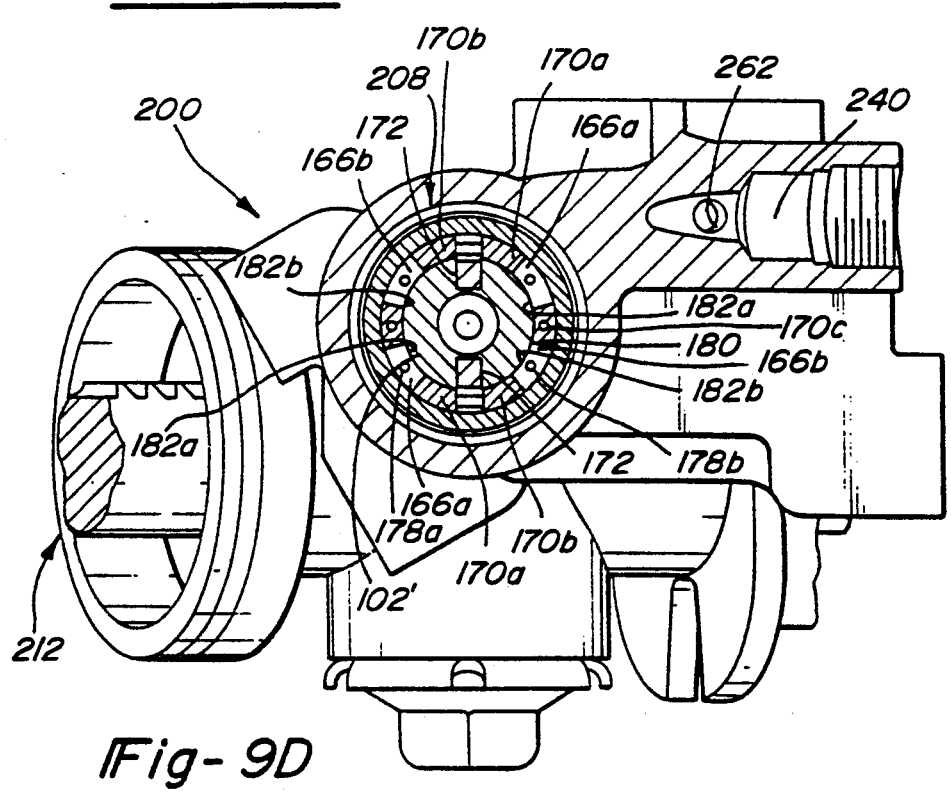

With particular reference to FIGS. 1 and 2 of the drawings, block diagrams are shown for a "by-pass" bootstrap hydraulic system 10 and a "regulated" bootstrap hydraulic system 12, respectively. Common to both systems are a prime mover 14, a reservoir 16, a reservoir delivery line 17, a pump delivery line 18, a four-way control valve 20, first and second load lines 22a and 22b, respectively, a power output transducer 24, an input line 28, and a pressure regulating valve assembly 30.

In "by-pass" bootstrap system 10 of FIG. 1, prime mover 14 drives a fixed displacement pump 32 which draws hydraulic fluid from reservoir 16 through reservoir delivery line 17 and pumps pressurized hydraulic fluid into pump delivery line 18. Pump delivery line 18 is in fluid communication with both control valve 20 and pressure regulating valve assembly 30 via a relief valve 26 and input line 28. Relief valve 26 can be of any known form and is set to a selected value of differential pressure (which is generally a very nominal value such as only 50 psi) so that the pressure of the hydraulic fluid flowing therethrough is reduced by substantially that selected value of differential pressure.

In response to a relative position difference between a control input and feedback input (if feedback is utilized to configure by-pass bootstrap system 10 as a feedback control system), control valve 20 controls the hydraulic fluid flow or "load flow", derived from pump delivery line 18 and returned to reservoir 16, between first and second load lines 22a and 22b, respectively, to power output transducer 24 in a conventional manner. Concomitantly, the fluid pressure present in each of first and second load lines 22a and 22b, respectively, is differentially applied to pressure regulating valve assembly 30. Pressure regulating valve assembly 30 is operable to selectively by-pass hydraulic fluid delivered from pump delivery line 18, via relief valve 26 and input line 28, to reservoir 16 such that the fluid pressure in pump delivery line 18 nominally conforms to the following relation:

$$P_S = K_1 |P_L| + \Delta P, \tag{1}$$

where $P_S$ is the supply pressure present in pump delivery line 18, $|p_L|$ is the absolute value of the "load pressure" (i.e., the absolute value of the pressure differential between load lines 22a and 22b) $K_1$ is a selected proportionality factor (whose value is usually selected to be 1.0 or very slightly higher in order to compensate for the effects of system leakage and losses) and $\Delta P$ is a desired minimum value of $P_s$ at a zero value of $P_L$ ($\Delta P$ being mostly determined by pressure drop through relief valve 26). Thus, the fluid pressure (the supply pressure $P_s$) in pump delivery line 18 is nominally maintained at a value equal to the sum of the absolute value of the load pressure and $\Delta P$.

In "regulating" bootstrap system 12 of FIG. 2, prime mover 14 drives a variable displacement pump 34 which draws hydraulic fluid from reservoir 16 through delivery line 17 and pumps the pressurized hydraulic fluid into pump delivery line 18. Pump delivery line 18 is in fluid communication with both control valve 20 and pressure regulating valve assembly 30 via an orifice, schematically shown at 27, and input line 28. The function of orifice 27 is to selectively limit the flow of hydraulic fluid through pressure regulating valve assembly 30.

In response to a relative position difference between a control input and feedback input (if feedback is utilized to configure regulating bootstrap system 12 as a feedback control system), control valve 20 controls the load flow, derived from pump delivery line 18 and returned to reservoir 16, between first and second load lines 22a and 22b, respectively, to power output transducer 24. Concomitantly, pressures present in first and second load line 22a and 22b, respectively, are differentially applied to pressure regulating valve assembly 30 (which is usually modified for significantly lower hydraulic fluid flow values as determined by flow characteristics of orifice 27). Pressure regulating valve assembly 30 selectively by-passes the hydraulic fluid delivered from pump delivery line 18, via orifice 27 and input line 28, to reservoir 16 such that the fluid pressure in input line 28 nominally conforms to the following relation:

$$P_I = K_1 |P_L| \qquad (2)$$

where $P_I$ is the pressure in input line 28, and $|P_L|$ and $K_1$ retain their definitions as described above. In addition, conduit 15 is shown as providing fluid communication between input line 28 and variable displacement pump 34. Moreover, the displacement of variable displacement pump 34 is varied such that the supply pressure $P_s$ in pump delivery line 18 is equal to $P_L$ plus a desired value of $\Delta P$. Thus, the fluid pressure in pump delivery line 18 is again nominally maintained at a value equal to the sum of the absolute value of the load pressure and $\Delta P$. Numerous alternative constructions for pressure regulating valve assembly 30 are fully disclosed in U.S. Ser. No. 07/774,055 filed Oct.7, 1991 entitled "CONTROL VALVE FOR BOOTSTRAP HYDRAULIC SYSTEM", assigned to the common assignee of the present application, and which is expressly incorporated by reference herein.

With reference now to FIGS. 3 and 4, block diagrams are shown which are representative of a simplified "by-pass" bootstrap system 40 and a simplified "regulated" bootstrap system 42. Common to both systems are prime mover 14, reservoir 16, reservoir delivery line 17, pump delivery line 18, four-way control valve 20, first and second load lines 22a and 22b, respectively, and power output transducer 24.

In "by-pass" bootstrap system 40, prime mover 14 drives fixed displacement pump 32 which draws hydraulic fluid from reservoir 16 via reservoir delivery line 17 and pumps pressurized fluid into pump delivery line 18. Pump delivery line 18 is in fluid communication with both control valve 20 and a pressure regulating valve assembly 44 which combines the functions of relief valve 26 and pressure regulating valve assembly 30 of FIG. 1. However, pressure regulating valve assembly 44 functions to maintain fluid pressure in pump delivery line 18 at a value equal to the "higher" valued one of the fluid pressures in first and second load lines 22a and 22b, respectively, plus a desired value of approximately $\Delta P/2$ (where $\Delta P$ retains its prior definition). As such, pressure regulating valve assembly 44 is unique in that it regulates an input pressure value as a selected function of the highest valued one of any plurality of line pressures.

Thus, the pressure drop between pump delivery line 18 and the higher valued one of first and second load lines 22a and 22b, respectively, is approximately $\Delta P/2$.

Assuming that four-way control valve 20 is of a symmetrical design, the pressure drop between the lower valued one of first and second load lines 22a and 22b, respectively, and a return line 46 (to reservoir 16) is also about $\Delta P/2$. This is because the hydraulic fluid flow (i.e., the load flow) from the lower valued one of first and second load lines 22a and 22b, respectively, is substantially identical to the hydraulic fluid flow to the higher valued one of first and second load lines 22a and 22b, respectively. Since the absolute value of the load pressure $|P_L|$ is equal to the absolute value of the difference in pressure between the higher and lower values of pressure in first and second load lines 22a and 22b, respectively, the supply pressure $P_s$ is nominally equal in value to $|P_L| + \Delta P$. As will be shown below, the actual value of $P_s$ is slightly higher than $|P_L| + \Delta P$ because of the effect of the flow induced forces present within pressure regulating valve assembly 44.

In "regulating" bootstrap system 42 of FIG. 4, prime mover 14 drives a variable displacement pump 34 which draws hydraulic fluid from reservoir 16 via pressure delivery line 17 and pumps pressurized fluid into pump delivery line 18. Pump delivery line 18 is in communication with both control valve 20 and a pressure regulating valve assembly 48 which differs from pressure regulating valve assembly 44 in that it does not feature any relief valve function. More particularly, pressure regulating valve assembly 48 is adapted to selectively by-pass the hydraulic fluid delivered from pump delivery line 18 through orifice 50 and input line 52 to reservoir 16 such that the fluid pressure in input line 52 is nominally equal in value to the higher valued one of the pressures present in first and second load lines 22a and 22b, respectively. In addition, the displacement of variable displacement pump 34 is varied such that the supply pressure $P_s$ present in pump output line 18 is equal to the higher valued one of the pressures present in first and second load lines 22a and 22b, respectively, plus an additional desired value of approximately $\Delta P/2$. Thus, the pressure present in pump delivery line 18 is nominally maintained at a value equal to $|P_L| + \Delta P$.

With reference now to FIG. 5 a suitable construction for pressure regulating valve assembly 44 is shown. In pressure regulating valve assembly 44, first and second valve spools 50a and 50b, respectively, are positioned within first and second valve sleeves 52a and 52b, respectively, in a closefitting but axially slidable manner. In addition, first and second load lines 22a and 22b, respectively, communicate with first and second control chambers 54a and 54b, respectively. Thus, first and second axial forces are biasingly applied to first ends 56a and 56b of first and second valve spools 50a and 50b, respectively. The first and second axial forces are equal to the sum of the products of the pressures so communicated and the areas of first ends 56a and 56b of first and second valve spools 50a and 50b, respectively, and the biasing force exerted by first and second springs 58a and 58b, respectively.

If the higher one of the first and second axial forces is the first axial force, then the first axial force is balanced by a first opposing axial thrust derived from the fluid pressure in pump delivery line 18 as applied to second end 60a of first valve spool 50a. In operation, any difference between the first thrust and the first axial force will cause axial movement of first valve spool 50a until a first circumferential orifice 62a of appropriate area is opened axially between a first spool groove 64a and a first sleeve groove 66a. Therefore, by-passed hydraulic fluid (i.e., hydraulic fluid flow in excess of load flow) flows from first sleeve groove 66a to a second spool groove 64b at a pressure ($P_1$) via intermediate line 70. Similarly, any difference between a second opposing axial thrust derived from the product of the pressure and the area of second end 60b of second valve spool 50b and the second axial force will cause axial movement of second valve spool 50b until a second circumferential orifice 62b of appropriate area is opened axially between second spool groove 64b and second sleeve groove 66b where a pressure ($P_2$) is determined by spring force exerted by the second spring 58b. However, because the second axial force is, in general, less than the first axial force, axial movement of second valve spool 50b results in the pressure ($P_2$) being lower in value than the pressure ($P_1$). Thus, the supply pressure ($P_s$) is equal in value to the pressure ($P_1$) and by-passed hydraulic fluid then flows from second sleeve groove 66b to reservoir 16.

Conversely, if the higher one of the first and second axial forces is the second axial force, then the first axial force is overcome by the first opposing axial thrust such that first valve spool 50a moves downwardly opening first circumferential orifice 62a completely. By-passed hydraulic fluid flows from first sleeve groove 66a to second input chamber 64a at the supply pressure ($P_s$). Any difference between the second opposing axial thrust derived from the product of the pressure and the area of second end 60b of second valve spool 50b and the second axial force will cause axial movement of second valve spool 50b until second circumferential orifice 62b of an appropriate area is opened axially between second spool groove 64b and second sleeve groove 66b. By-passed hydraulic fluid then flows from second return sleeve groove 66b to reservoir 16.

A slightly modified version of pressure regulating valve assembly 44 eliminates springs 58a and 58b and is operable for use as pressure regulating valve assembly 48 with "regulated" bootstrap system 42 of FIG. 4. Thus, the pressure in input line 52 approximates the "higher" valued one of the pressures present in first and second load lines 22a and 22b, respectively, rather than that value plus approximately $\Delta P/2$ as in the pressure regulating valve assembly 44.

It would be desirable to be able to smoothly stop loads having high inertia values (i.e., such as the arm of a backhoe) without hydraulic cavitation and shock. A preferred way of doing this would be to provide a balanced four-way valve having working orifices whose area increases quadratically with respect to valve deflection. With reference to FIGS. 6A and 6B, such a balanced four-way control valve 100 is presented having a valving sub-assembly 101 which includes a valve spool 102 and a valve sleeve 104. In four-way control valve 100, torque applied to a valve spool 102 causes valve spool 102 to move rotationally with respect to a valve sleeve 104 wherein it is positioned in a closefitting yet rotatable manner. Valve sleeve 104 is positioned within a valve housing 106 in a fixed manner such as via an interference fit there between. Valve spool 102 is located axially with respect to valve body 106 and valve sleeve 104 by a torsion bar 110 and a pin 112.

Hydraulic fluid enters four-way control valve 100 from pump delivery line 18 and flows through the following path: an input port 114 formed in valve housing 106; an annular input groove 116, a plurality of radial input ports 118 and a plurality of laterally spaced input slots 120 all of which are formed in valve sleeve 104. Since four-way control valve 100 is a "closed-centered" valve, when valve spool 102 is rotationally centered within valve sleeve 104, hydraulic fluid passage is "blocked". Upon valve spool 102 being tangentially rotated against the torsional resistance provided by torsion bar 110 in a first direction, hydraulic fluid is permitted to flow from input slots 120 to a first set of helical output slots 122a formed in valve spool 102 via a first set of triangular shaped output orifices (not shown) to define the load flow. The triangular output orifices are generated upon sufficient rotation of valve spool 102 for causing a leading edge of first helical output slots 122a to open into input slots 120. The load flow then flows out of balanced four-way control valve 100 via a first set of radial output ports 126a and a first annular output groove 128a (both of which are formed in valve sleeve 104) to a first distribution port 130a which, in turn, is in fluid communication with first load line 22a. In this manner, the load flow is delivered to a first end of power output transducer 24.

Load flow returning from the opposite end of power output transducer 24 enters balanced four-way valve 100 via second load line 22b and a second distribution port 130b and flows into a second annular output groove 128b and a second set of radial output ports 126b formed in valve sleeve 104. Thereafter, the returning load flow enters a second set of helical output slots 122b formed in valve spool 104. The load flow then flows into return slots (not shown) formed in valve sleeve 104 via a first set of triangular shaped return orifices (not shown). Again, the triangular return slots are generated upon rotation of valve spool 102 causing a leading edge of helical output slots 122b to open into the return slots formed in valve sleeve 104. The load flow exits the return slots and is returned to reservoir 16 through exhaust ports 132 formed in valve spool 102, chamber 134, through holes 136, valve chamber 138 and return port 140. As is clearly seen from FIG. 6B, first and second helical output slots 122a and 122b, respectively, are alternately spaced in a like numbered plurality around the circumference of valve spool 102. In addition, the return slots are parallel to, and alternately spaced with, input slots 120 in a like numbered plurality along the inner circumferential surface of valve sleeve 104.

If valve spool 102 is rotated in an opposite direction against the torsional resistance provided by torsion bar 110, then the hydraulic fluid flows in an opposite manner from that explained above. As such, the load flow passes out through a second set of triangular shaped output orifices and in through a second set of triangular shaped return orifices. In addition, balanced four-way control valve 100 has a dust seal 142, fluid seal 144 and O-ring seals 146a, 146b and 146c which are provided to keep the dust out and the hydraulic fluid in. One preferred method of forming the alternating input and return slots in valve sleeve 104 is by broaching. In that case, sealing rings 148 are utilized to seal off the terminal ends of the slots.

Helical output slots 122a and 122b, respectively, may be formed such that the first and second sets of triangular shaped output and return orifices will begin to "open" substantially simultaneously with valve spool 102 beginning to rotate, in which case four-way valve 100 is referred to as a "zero-lapped" four-way control valve. Alternately, they may be formed such that first and second sets of triangular shaped output and return orifices do not begin to open up until a selected amount or rotation of valve spool 102 has occurred, in which case four-way valve 100 is an "over-lapped" four-way control valve. In either case, four-way control valve 100 is generically referred to as a "closed-center" valve wherein its hydraulic performance can be illustrated by a set of normalized pressure-flow curves which depict load flow v. load pressure for various rotational positions of valve spool 102 beyond the point where first and second sets of triangular shaped output and return orifices begin to open up.

With reference to FIG. 7, there is presented a graph which depicts such a set of pressure-flow curves 150a-h. Operation in either of first quadrant 152 or third quadrant 154 implies that power is delivered to power output transducer 24 while operation in either of the second quadrant 156 or fourth quadrant 158 implies negative power flow (from a overhauling load) to power output transducer 24. The graph is normalized with its abscissa variable equal to $P_L/P_{LM}$ and its ordinate variable equal to $Q_L/[CP_dA_{VM}(\Delta P g/w)^{0.5}$ where w is the specific weight of the hydraulic fluid, g is the acceleration of gravity, $A_{VM}$ is maximum possible valve orifice area and, C is the flow coefficient associated with the working orifices.

The curves 150a-d and 150e-h are horizontal lines in first and third quadrants 152 and 154, respectively, as expected from discussions presented above. In second and fourth quadrants 156 and 158, respectively, however, the pressure across each working control valve orifice is substantially equal to $P_L + \Delta P/2$ as also discussed above. Thus, because of the square root law relationship between the pressure drop across the triangular orifices and flow therethrough, curves 150a-d and 150e-h become quadratic in second and fourth quadrants 156 and 158, respectively, where their (imaginary) origin is equal to a value of $\Delta P/2P_{LM}$ of the opposite sign.

Many hydraulic systems are configured without tactile feedback related to system load. An obvious example is the hydraulic systems that move the arm of a backhoe. These systems comprise closed center control valves that must be capable of supporting the arm in a stationary manner without operator input. Since tactile feedback would cause motion of control valve, it cannot be used. Even some vehicular power steering systems are configured without tactile feedback related to steering load. Examples comprise off-road and marine power steering systems wherein no load sensitivity is desired. In either case, this is because load variations due to uneven ground or wave action should be overcome by the power steering system. In all of these cases the various embodiments described above are ideal as they stand.

However, in many hydraulic systems tactile feedback related to system load is desirable. An obvious example is on-road vehicular power steering. Surprisingly, some vehicular power steering systems include rotary control valves wherein tactile feedback directly related to steering load is not utilized. Instead, the rotary valves (which are generally open-center control valves utilizing constant flow hydraulic power sources) present torque related to valve motion to the vehicle operator. Some power steering systems do include such a direct tactile feedback device wherein a reaction torque is presented to the vehicle operator.

With reference now to FIG. 8A and 8B, there is presented a reaction torque device 160 which is a modification of four-way valve 100 shown in FIGS. 6A and 6B for defining a control valve with reaction torque. Due to the similarity of components, like numerals are used to designate previously described components. In particular, FIG. 8B is a section view taken along line A—A of FIG. 8A while FIG. 8A is a section view taken along line B—B of FIG. 8B. In reaction torque device 160, portions of a circumferential groove 162 formed in an oversize sealing ring 164 affixed within one end of valve sleeve 104, are utilized to form one or more sets (the number of sets designated as "N") of first and second reaction chambers or cylinders 166a and 166b, respectively. First, second and third portions of a ring 168 are utilized to define similarly numbered ("N") sets of first and second pistons 170a and 170b, and flow barrier 170c, respectively. A drive pin 172 is pressed into a radial hole 174 formed in valve spool 102. Assembly access for drive pin 172 is implemented via an access slot 176 also formed in oversize sealing ring 164. When first and second reaction chambers or cylinders 166a and 166b, respectively, are pressurized, first and second pistons 170a and 170b, respectively, each bear against drive pin 172. Furthermore, a first and second set of longitudinally extending travel limiting pins 178a and 178b, respectively, limit the reverse travel of first and second pistons 170a and 170b, respectively. In addition, pins 180 are used to tangentially position flow barrier 170c.

Generally, operation is similar to that described for balanced four-way control valve 100. In addition, however, fluid in first and second output ports 126a and 126b, respectively, communicates with first and second reaction cylinders 166a and 166b, respectively, via one each of first and second sets of helical output slots 122a and 122b, respectively, and first and second slots 182a and 182b, respectively. Thus, the load pressure $P_L$ is differentially applied to first and second pistons 170a and 170b, respectively, and reaction torque is presented to valve spool 152 via drive pin 172. The reaction torque can be found from the equation:

$$T_R = NP_L c(b^2 - a^2)/2 \quad (3)$$

where $T_R$ is the reaction torque, a and b are the inside and outside radii, respectively, of first and second pistons 170a and 170b, respectively, and c is the axial length of first and second pistons 170a and 170b, respectively.

With reference now to FIGS. 9A through 9D, there is presented a vehicular power steering control apparatus 200 configured to incorporate a pressure regulating valve assembly 202 that is substantially identical to pressure regulating valve assembly 44 shown in FIG. 5, a balanced four-way control valve 204 whose function conforms substantially to that of four-way valve 100 except that valve sleeve 104' is selectively allowed to rotate with respect to a valve housing 206, and a reaction torque device 208 that is substantially identical to device of FIGS. 8A and 8B (wherein N=2). In view of the commonality of components, like numbers designate previously described components while primed numbers are used to describe slightly modified yet substantially identical functioning components. In power steering control apparatus 200, steering wheel torque is applied to an input portion 210 of valve spool 102' and the power output transducer 24 comprises a piston-rack assembly 212. The rotational position of valve sleeve 104' is substantially coupled to the translational position of piston-rack assembly 212 via a pinion shaft 214 which drives valve sleeve 104' via a drive pin 216 in a conventional manner.

Pinion 214 is located axially by a first bearing 218 and in lateral directions and in pitch and yaw by the combination of first bearing 218 and a second bearing 220. Similarly, valve spool 102' is located in lateral directions and in pitch and yaw by the combination of third and fourth bearings 222 and 224, and axially and in roll by torsion bar 110' and pin 112. Valve sleeve 104' is positioned axially by drive pin 216, and laterally and in pitch and yaw by its closefitting relationship around valve spool 102'. Piston-rack assembly 212 is held in substantially backlash free engagement with pinion shaft 214 by a spring loaded yoke 226 in a known manner. In addition, hydraulic fluid is retained within valve housing 206 by seals 228 and 230, and dust is excluded by a dust seal 232. Piston-rack assembly 212, pinion shaft 214, spring loaded yoke 226, and bearings 218 and 220 are lubricated by a heavy grease which is retained by a cup 234.

Power steering control apparatus 200 is utilized in conjunction with a nominally constant flow hydraulic fluid source as previously described. Pressurized hydraulic fluid delivered by the nominally constant flow hydraulic fluid source enters power steering control apparatus 200 at an entry port 236 wherein its flow is split between pressure regulating valve assembly 202 and balanced four-way control valve 204. Load flow continues on and enters input groove 116, the plurality of input ports 118 and the plurality of input slots 120 all formed in valve sleeve 104'.

If counterclockwise torque is applied to input end 210 of valve spool 102', then valve spool 102, deflects torsion bar 110' and moves in a counterclockwise manner with respect to valve sleeve 104'. Thus, as previously described, load flow passes out through the second set of triangular shaped output orifices; the second set of helical output slots 122b; the second set of output ports 126b, second output groove 128b and second output port 130b to one end (i.e., the left end) of an output power cylinder (not shown but attached to end 238 of piston-rack assembly 212). Similarly, load flow returning from the opposite end (i.e., right end of the power cylinder) enters power steering control apparatus 200 via first output port 130a, first output groove 128a, the first set of output ports 126a, the first set of helical output slots 122a, through the second set of triangular shaped return orifices and into the valve sleeve return slots. From there the returning load flow enters return ports 132, control chamber 134, through holes 136 and valve chamber 138 to a return port 240 from which it returns to the nominally constant flow hydraulic fluid source.

The load flow causes piston-rack assembly 212 to move in the direction of end 238 and rotate pinion shaft 214 in a counterclockwise direction. Piston-rack assembly 212 also deflects the tie-rod and dirigible wheel assemblies (not shown) of the host vehicle such as to effect a left turn. In so doing, piston-rack assembly 212 must typically overcome steering forces generated due to tire patch deflection and wheel castor in order to execute the left turn. Thus, a second output pressure signal present in second output groove 128b concomitantly must increase while a first output pressure signal present in first output groove 128a stays nominally constant. The first and second output pressure signals are conveyed from first and second output grooves 128a and 128b, respectively, to first and second control chambers 54a' and 54b', respectively, of pressure regulating valve assembly 202 via first and second pressure signal ports 242a and 242b, respectively, first and second pressure signal grooves 244a and 244b, respectively, and first and second ports 246a and 246b, respectively.

Normally the majority of the hydraulic fluid is bypassed through pressure regulating valve assembly 202. More particularly, hydraulic fluid enters pressure regulating valve assembly 202 via a first entry passage 250a from entry port 236 and flows through a first set of radial ports 252a to a first valve spool groove 254a. Because the first pressure signal is relatively low, first valve spool 50a is held in an open position and hydraulic fluid freely flows through first circumferential orifice 62a to first port groove 66a formed in first valve sleeve 52a. The hydraulic fluid then flows through a first set of valve sleeve ports 256a, a first collecting groove 258a, a cross passage 260, a second entry passage 250b, and a second set of radial ports 252b to a second valve spool groove 254b. Because the second pressure signal is elevated, second valve spool 50b assumes its regulating attitude and hydraulic fluid flow is selectively metered through second circumferential orifice 62b to second port groove 66b formed in a second valve sleeve 50b. The hydraulic fluid then flows through a second set of valve sleeve ports 256b and a second collecting groove 258b to a return port 262 and return port 240.

As described above with respect to reaction torque device 160, fluid in the first and second output ports 126a and 126b, respectively, also communicates with each of first and second reaction chambers 166a and 166b, respectively, via two each of the first and second sets of helical output slots 122a and 122b, respectively, and two each of the first and second slots 182a and 182b, respectively. Thus, the load pressure $P_L$ is differentially applied to first and second pistons 170a and 170b, respectively, and reaction torque is presented to valve spool 102' via drive pins 172. Since N=2, the reaction torque can be found by:

$$T_R = P_L c(b^2 - a^2) \qquad (4)$$

Figure 10:
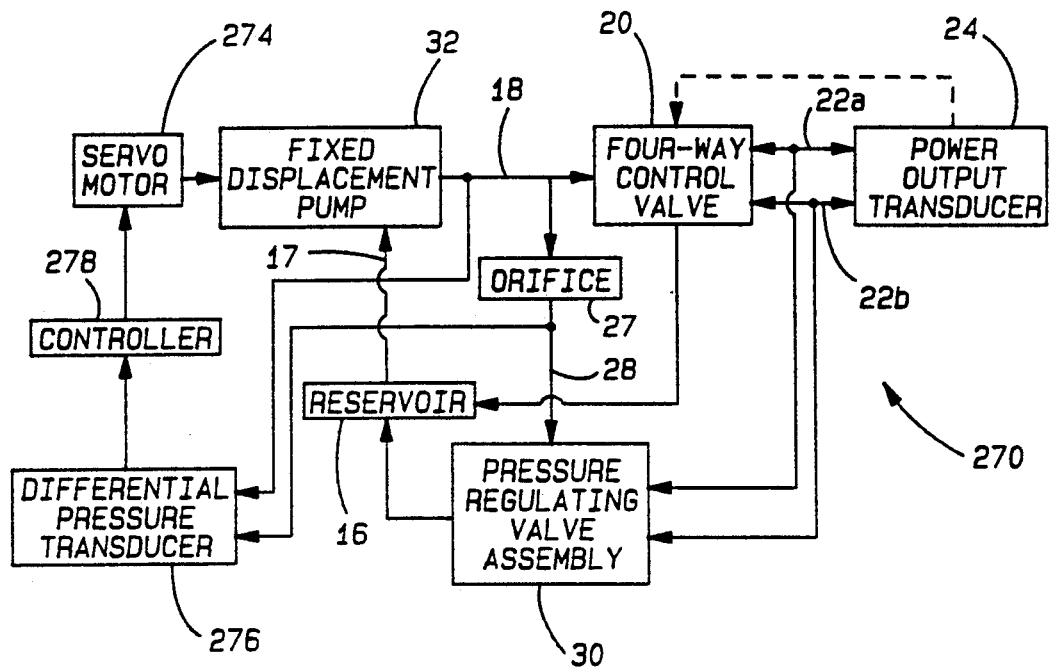
FIGS. 10 and 11 are block diagrams depicting alternate versions of electrically powered bootstrap control systems for use in vehicular power steering systems.
Figure 11:
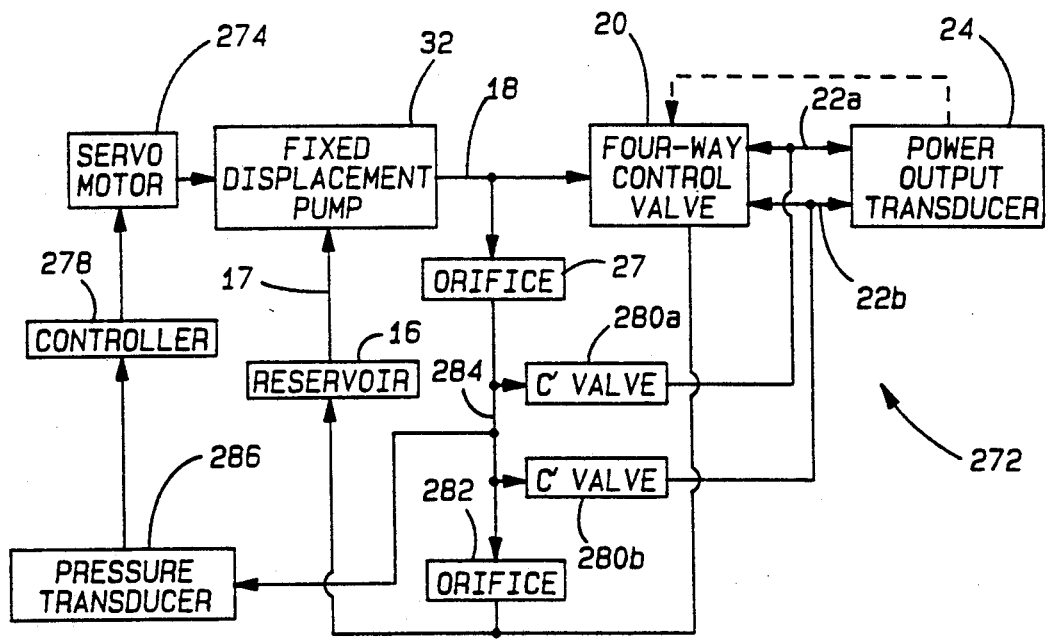

With reference now to FIGS. 10 and 11, block diagrams are shown depicting slightly differing versions of an electrically powered regulating bootstrap system, separately identified as 270 and 272. In electrically powered regulating bootstrap system 270, a servo motor (i.e., a permanent magnet DC motor) 274 is used to drive fixed displacement pump 32 while the remainder of the hydraulic circuitry is substantially the same as that described above with respect to regulating bootstrap system 12 shown in FIG. 2. However, in electrically powered regulating bootstrap system 270, fluid pressure in pump delivery line 18 and input line 28 are differentially sampled by a differential pressure transducer 276 that generates an electrical signal representative of the differential pressure (hereinafter "pressure signal") that is delivered to a controller 278. Controller 278 selectively provides a power signal to servo motor 274 so as to maintain the output pressure (in pump delivery line 18) substantially at a value of $|P_L| + \Delta P$.

In electrically powered regulating bootstrap system 272, pressure regulating valve assembly 30 is replaced by first and second check valves 280a and 280b, respectively, and an orifice 282. First and second check valves 280a and 280b are utilized to select the "lower" pressure one of the pressures in first and second load lines 22a and 22b, respectively. In addition, orifice 282 is used to allow fluid to circulate continuously through a pressure sense line 284 regardless of the state of first and second check valves 280a and 280b, respectively, and first and second load lines 22a or 22b, respectively. As noted above, if four-way control valve 20 is a symmetrical device, the desired "lower" pressure present in pressure sense line 284 is approximately $\Delta P/2$. A pressure transducer 286 is used to measure the pressure in pressure sense line 284 relative to ambient pressure. Then controller 278 selectively provides a power signal to servo motor 274 so as to maintain the pressure in pressure sense line 284 substantially at a value of $\Delta P/2$.

Figure 12A:
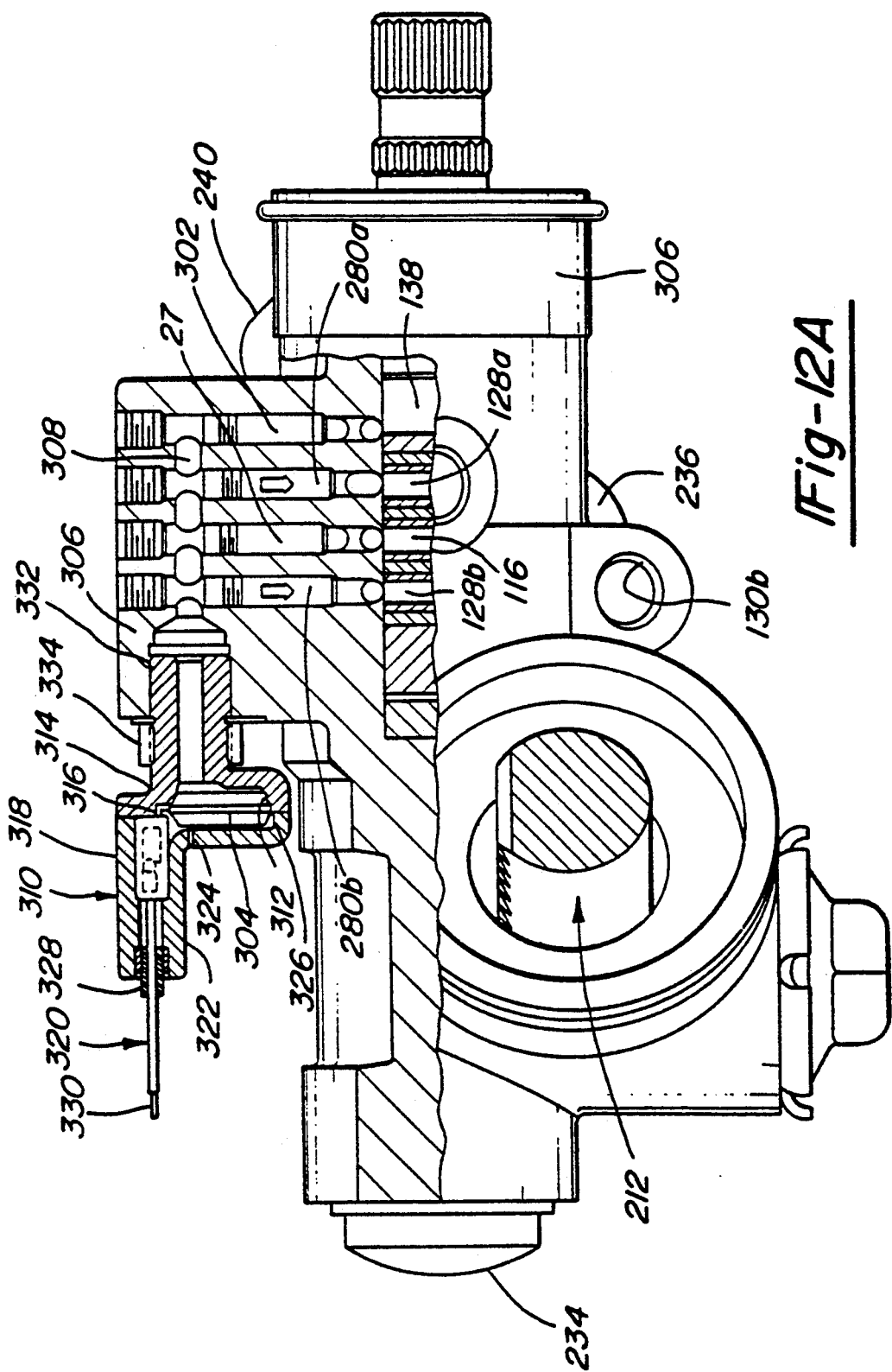
FIGS. 12A and 12B are sectional and end views, respectively, of a modified control apparatus adapted for use in the electrically powered vehicular power steering system shown in FIG. 11.
Figure 12B:
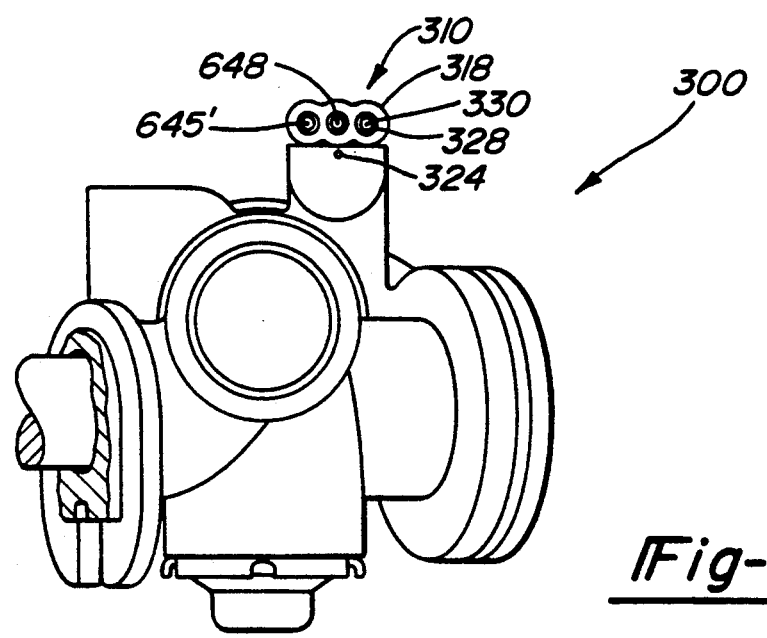

With reference now to FIGS. 12A and 12B, there is presented a vehicular power steering control apparatus 300 adapted for use in conjunction with electrically powered regulating bootstrap system 272 instead of control apparatus 200 depicted in FIGS. 9A through 9D, where FIG. 12A comprises a partially sectional view taken along section A—A of FIG. 12B. Supplementing the various components shown therein are orifices 27 and 302, check valves 280a and 280b, and a pressure transducer 304. Hydraulically, these components are located between entry port 236, first and second output ports 130a and 130b, respectively, and return port 240. The components shown are all commercially available items. More particularly, orifices 27 and 302 are Lee JEVA orifices, check valves 280a and 280b are Lee CHEK check valves and plugs are Lee Plugs, all available from the Lee Company of Westbrook, Conn.

Physically, orifices 27 and 302, and check valves 280a and 280b are installed in vertically oriented holes formed in valve body 306 which enter input groove 116, control chamber 134, first output groove 128a and second output groove 128b, respectively. Their opposite ends are in hydraulic communication via a hole 308, an enlarged portion of which is used for mounting pressure transducer assembly 310. Pressure transducer assembly 310 is such that pressure transducer 304 is bonded to a conically matching transducer mounting surface 312 formed in a mounting body 314. Leads 316 on pressure transducer 304 are formed at a nominally orthogonal angle and a connector 318, assembled on the end of a three wire cable 320, is positioned thereupon. A cover 322 having a vent hole 324 is bonded onto mounting body 314 at an interfacing joint 326. Cable seals 328 (which are previously assembled upon each wire 330 of three wire cable 320) are inserted into cavities formed in the cover 322 to seal wires 330. Finally, the completed pressure transducer assembly 310 is threadably inserted into valve body 306 via threads 332 and secured in place with a lock nut 334.

Both electrically powered vehicular power steering systems 270 or 272 have very significant application advantages over conventional electrically controlled vehicular power steering systems wherein dirigible wheel motion is directly controlled by an electric motor and/or hydraulically actuated systems wherein an electric motor is merely utilized as a prime mover to power a pump in an otherwise standard power steering system. First of all, any electrically powered system should be as efficient as possible to minimize battery drain and/or alternator load. Systems utilizing an electric motor as a prime mover in an otherwise standard system categorically fail in this regard while electrically powered vehicular power steering systems 270 and 272 have virtually the same efficiencies as is typical for totally electrical systems.

On the other hand, electrically powered vehicular power steering systems 270 and 272 are simpler than any known totally electrical system. Electrically powered vehicular power steering systems 270 and 272 are inherently fail-safe, so they do not require complex fail-safe error measuring apparatus, circuitry and power disconnect devices. Reference may be made to U.S. Pat. No. 4,956,590, entitled "Vehicular Power Steering System" by Edward H. Phillips and issued on Sep. 11, 1990 for a complete discussion of such fail-safe apparatus, the disclosure of which is expressly incorporated by reference herein.

Control of electrically powered vehicular power steering systems 270 and 272 is much simpler as well. Since servo DC motor 274 is utilized as a prime mover for the hydraulics only, it is never required to reverse or handle regenerative loads. This means that only one active power device is required to control it. Typically, four such devices arrayed in an "H" configuration are required for this purpose (again refer to U.S. Pat. No. 4,956,590 for a discussion on this point). In addition, the ancillary reduction in required transducers, control circuitry and/or software with respect to conventional electronically powered systems is also a significant advantage.

Figure 13A:
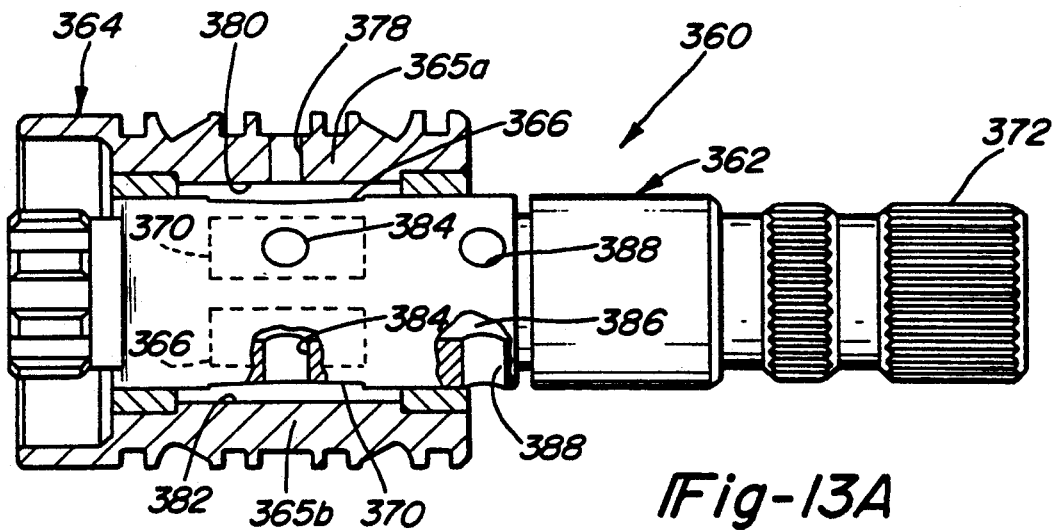
FIGS. 13A through 13C are views depicting various features of an improved valving sub-assembly for an "open-center" four-way control valve which can be incorporated into a vehicular power steering control apparatus similar to that shown in FIGS. 9A-D.
Figure 13B:
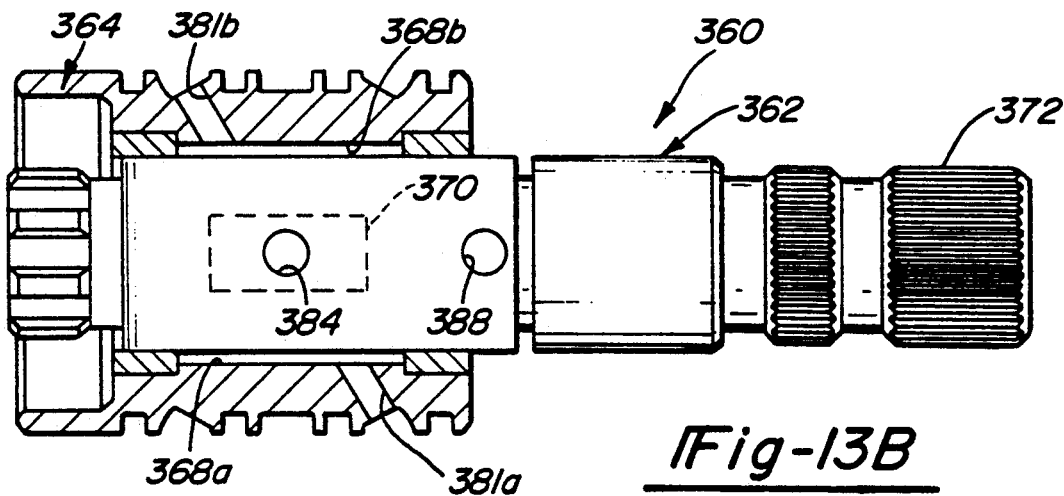
Figure 13C:
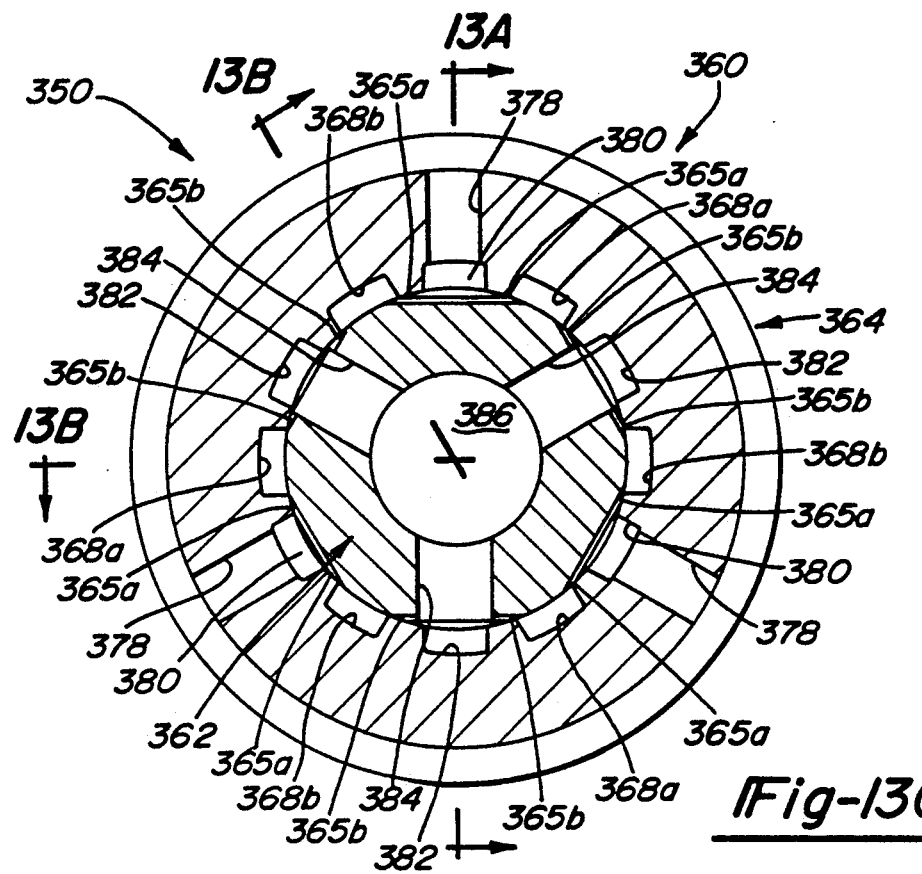

With particular reference now to FIGS. 13A through 13C, a valving sub-assembly 360 is disclosed which is generally a modification to valving sub-assembly 101 associated with four-way control valve 100 shown in FIGS. 6A and 6B and valving sub-assembly 101' associated with control valve 204 shown in FIGS. 9A through 9D. However, as will be fully described below, sub-assembly 360 is configured for utilization in an "open-center" four-way control valve 350. In general, valving sub-assembly 360 includes a valve spool 362 and a valve sleeve 364. Furthermore, valving sub-assembly 360 includes input orifices 365a associated with laterally formed input slots or notches 366 formed in valve spool 362, return orifices 365b associated with laterally formed return slots or notches 370 formed in valve spool 362, and first and second output slots 368a and 368b, respectively, formed in valve sleeve 364. As will also be fully described below, the performance characteristics of valving sub-assembly 360 can be selectively customized by varying the particular contour for input and return notches 366 and 370, respectively so as to determine the specific opening geometries for input and return orifices 365a and 365b, respectively. For this reason, input and return notches 366 and 370, respectively, are depicted "generically" in FIGS. 13A and 13B by dashed lines. In any case, bootstrap hydraulic systems utilizing "open-center" control valve 350 having valving sub-assembly 360 incorporated therein are operable to generate tactile feedback from the torque required to deflect a spring member, such as torsion bars 110 or 110' when developing either differential load pressure and/or load flow.

As will be appreciated, input orifices 365a and return orifices 365b are provided for regulating the passage of fluid between input notches 366 and first and second output slots 368a and 368b, respectively, as well as for regulating fluid passage between first and second output slots 368a and 368b, respectively, and return notches 370. Since valving sub-assembly 360 is preferably utilized in conjunction with a compliant member, such as torsion bar 110, torque must be applied to input splines 372 of valve spool 362 to effect either generated load pressure or rotational motion. Thus, valving sub-assembly 360 may be utilized either with, or without, a supplemental reaction torque device (i.e., such as reaction torque device 208 of power steering control apparatus 200 shown in FIGS. 9A). In this regard, its function may be likened to that of a common rotary valve. However, the "controlled" supply pressure feature of the previously described hydro-mechanical bootstrap systems is operable to allow any excess pump flow to be by-passed directly to system reservoir 16 (not shown). Thus, input and return orifices 365a and 365b, respectively, are configured in a selected manner via choosing a particular construction for input and return notches 366 and 370, respectively.

Figure 14A:
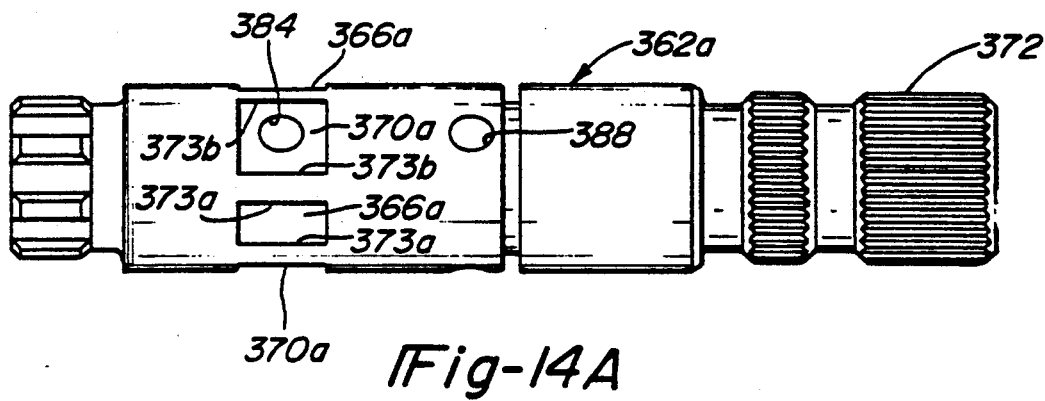
FIGS. 14A through 14C illustrate various configurations for the input and return slots formed in the valve spool for the open-center valving sub-assembly shown in FIGS. 13A-C.
Figure 14B:
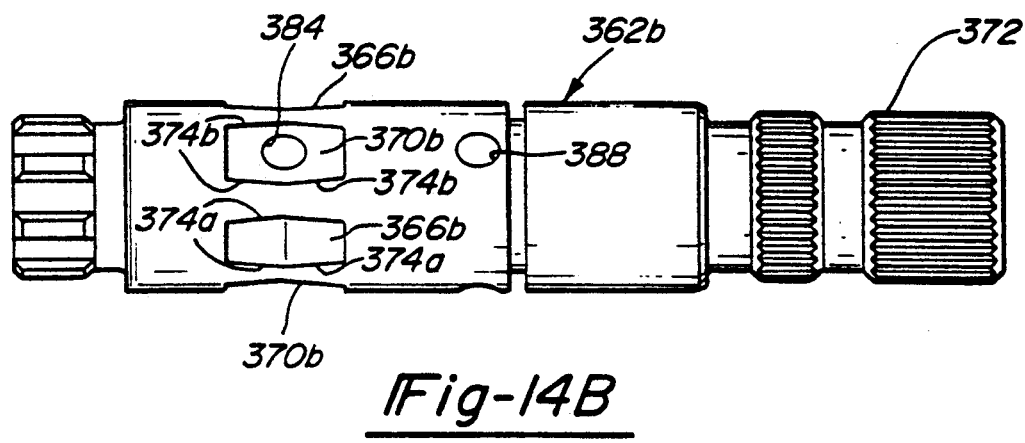
Figure 14C:
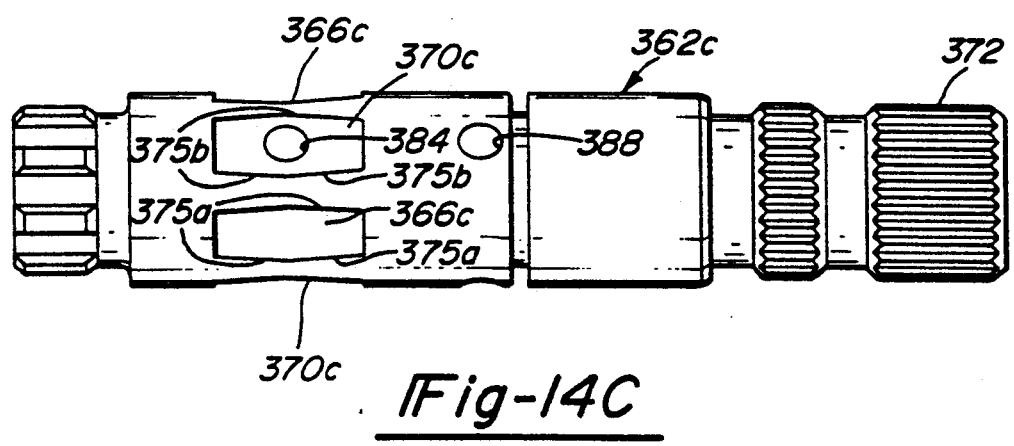

With reference now to FIGS. 14A through 14C, valve spool 362 is shown with three exemplary sets of input notches 366a, 366b and 366c, respectively, and return notches 370a, 370b and 370c, respectively, formed thereon. More particularly, FIG. 14A shows input notches 366a and return notches 370a formed in valve spool 362a with laterally squared-off edge contours 373a and 373b, respectively, for defining a substantially "uniform" contour. FIG. 14B illustrates input notches 366b and return notches 370b that are formed in valve spool 362b with laterally and divergently pointed edge contours 374a and 374b, respectively, that diverge in a "linear" manner. Finally, FIG. 14C depicts input notches 366c and return notches 370c that are formed on valve spool 362c with laterally and divergently pointed edge contours 375a and 375b, respectively, that diverge in a "non-linear" square-law manner. Accordingly, the manner in which the axial lengths of input and return orifices 376a and 376b, respectively, (FIG. 13A) and thus their rate of change of crosssectional area vary in response to tangential motion of valve spool 362 (with respect to valve sleeve 364) are dependent upon the specific geometry chosen for input notches 366 and return notches 370. As will be appreciated, these parameters are fixed when "uniform" input notches 366a and return notches 370a are used, increase in a linear manner when "linear" input notches 366b and return notches 370b are used, and increase in "non-linear" square-law manner when input notches 366c and return notches 370c are used.

Although specific notch contours are illustrated in FIGS. 14A–14C, they are to be considered as merely exemplary in nature. Any other selected notch contours could be utilized as well. For instance, although edge contours 373a and 373b, 374a and 374b, and 375a and 375c are depicted as increasing in width according to a zero power law, a first power law and a second power law, respectively, (i.e., with respect to tangential motion of valve spool 362) any intermediate or even larger power relationship value could have been likewise chosen.

With continued reference to FIGS. 13A through 13C the flow characteristics of sub-assembly 360 will now be described in greater detail. In operation, fluid provided externally by a pump (not shown) flows through input ports 378 to input slots 380 formed in valve sleeve 364 and thereafter to input notches 366 formed in valve spool 362. Fluid then flows through input orifices 365a to first and second output slots 368a and 368b, respectively, which are formed in valve sleeve 364, and through either set of first and second output ports 381a and 381b, respectively, to a load (i.e., such as a power cylinder of a vehicular power steering system). Simultaneously, fluid returning from the load flows through the other set of first and second output ports 381a and 381b, respectively. Thereafter, the hydraulic fluid, along with any by-passed fluid, flows through first and second output slots 368a and 368b, respectively, through return orifices 365b and to return notches 370 formed in valve spool 362. The returning fluid then flows through return slots 382 and return ports 384 to internal chamber 386. Finally, the returning fluid flows out relief holes 388, through a valve housing port and return line (neither being shown) of open-center four-way control valve 350 to reservoir 16 in a known manner.

One method of varying the angle of incidence can be seen in FIG. 13C wherein first and second output slots 368a and 368b, respectively, are symmetrically positioned (in mirrored fashion) closer to input slots 380 than return slots 382. Concomitantly, each of edge contours 373a, 374a and 375a are formed with substantially identical contours, but at less depth, than edge contour 373b, 374b and 375b whereby complete orifice closure is obtained with the same deflection angle for input orifices 365a as for return orifices 365b. This results in an incidence angle $\alpha$ for input orifices 365a that is smaller than incidence angle $\beta$ for return orifices 365b. Since the actual opening height is related to the sine of the incidence angle, it follows that return orifices 365b have a larger value of opening height than input orifices 365a. Further, since the actual orifice area is determined by the functions noted above, relatively small differences (i.e., in the order of six degrees for "uniform" edge contours 373a and 373b, three degrees for "linear" edge contours 374a and 374b, and two degrees for "non-linear" edge contours 375a and 375b) in the incidence angle can compensate for the significantly differing values of the flow coefficient between input orifices 365a and return orifices 365b.

Because supply flow $Q_s$ is larger than load flow $Q_L$, valving sub-assembly 360 is particularly optimized for use in power steering systems which are configured as hydro-mechanical "by-pass" bootstrap systems wherein the significantly greater volume of the supply flow, provided by the pump, is by-passed directly to system reservoir 16. As will be appreciated, even though system efficiencies are slightly reduced when compared with power steering systems disclosed hereinabove (i.e., those utilizing closed-center four-way valves), power steering systems using valving sub-assembly 360 are significantly more efficient than conventional power steering systems which use valving sub-assemblies that actually consume all of the fluid flow. Moreover, since many power steering systems are presently utilizing electric motor driven pumps in association with the highly inefficient conventional valving sub-assemblies, it is apparent that valving sub-assembly 360 can also be effectively used with electrically powered regulating bootstrap systems 270 and 272 described above and shown in FIGS. 11 and 12, respectively. In either case, valving sub-assembly 360 would be incorporated into four-way control valve 20 instead of one of the closed-center valving assemblies described hereinbefore.

Figure 15:
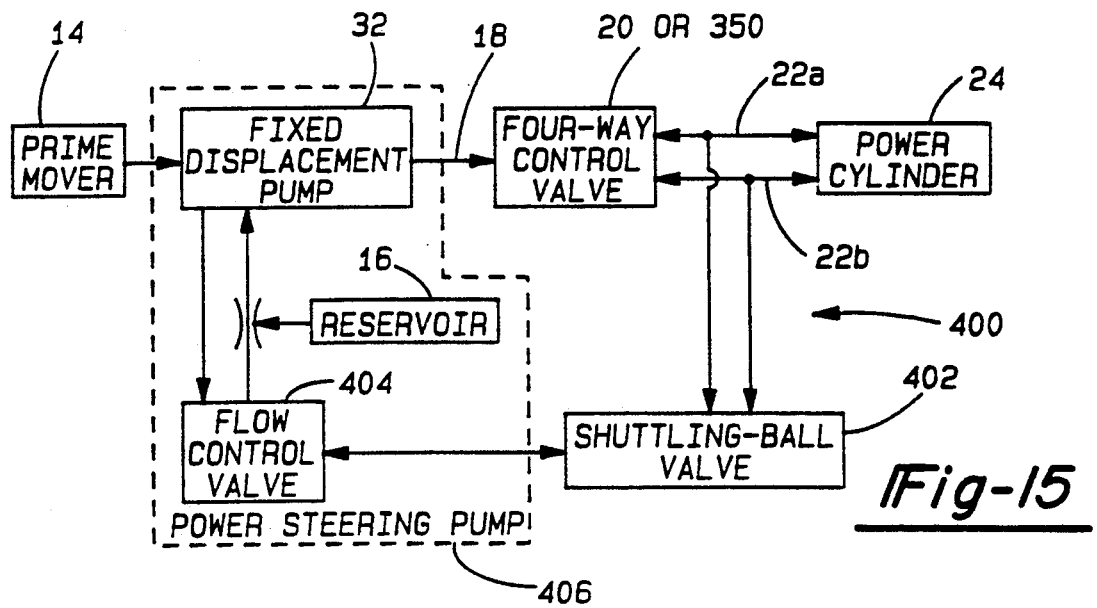
FIG. 15 is a block diagram of a bootstrap control system which is particularly well-suited for retrofit installation into existing vehicular power steering systems.

With particular reference now to FIG. 15, a block diagram representing a power steering system 400 of the type particularly well-suited for retrofit installation into virtually any existing vehicular power steering systems is shown. In function, power steering system 400 is similar to by-pass bootstrap system 40. However, power steering system 400 utilizes a shuttling-ball valve 402 operable to select the "higher" valued one of the output pressures provided by the four-way control valve. Thereafter, the higher valued output pressure is applied directly to a flow control valve 404 of a conventional power steering pump 406 to provide suitable supply pressure regulation for power steering system 400.

Figure 16:
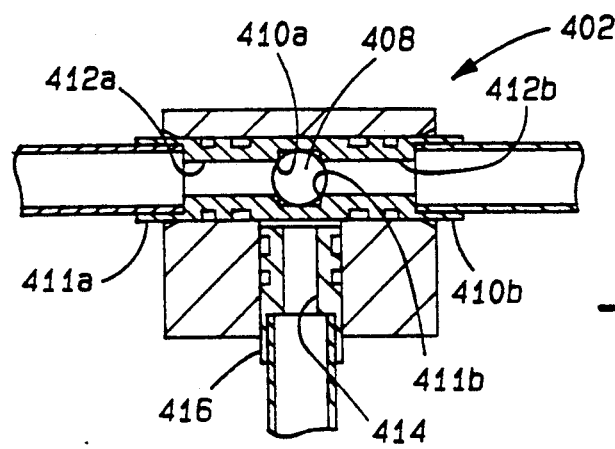
FIG. 16 is a sectional view of an exemplary shuttling-ball valve which can be used with the bootstrap power steering control system of FIG. 15 for selecting the "higher" valued one of two output pressures delivered by the four-way control valve.

With reference now to FIG. 16, there is presented a partial sectional view of a suitable construction for shuttling-ball valve 402 wherein a ball 408 is diverted between first and second seats 410a and 410b, respectively, formed in first and second input fittings 411a and 411b, respectively, to close the one of first and second passages 412a and 412b, respectively, having the lower valued one of the output pressures provided by the four-way control valve. In operation, the fluid in the first or second passage 412a or 412b, respectively, having the higher valued pressure forces ball 408 into sealed engagement with the other one of first and second seats 410a and 410b, respectively. Then, the higher valued pressure is conveyed through output port 414 formed in an output fitting 416 to a pressure regulating valve assembly having a single input control port. Alternately, the flow regulating circuit of a common vehicular power steering pump may be modified to serve this purpose.

Figure 17:
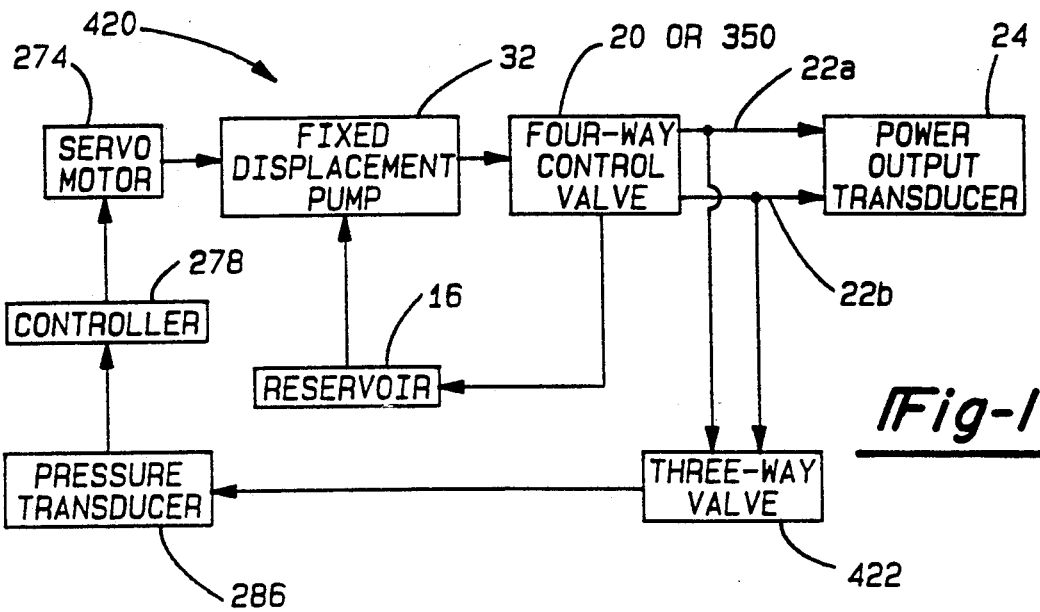
FIG. 17 is a block diagram of an electrically controlled bootstrap control system for a vehicular power steering system.

With reference now to FIG. 17, a block diagram representing an electrically powered regulating bootstrap system 420 is shown. Electrically powered regulating bootstrap system 420 is similar in function to electrically powered regulating bootstrap system 272 depicted in FIG. 11. However, electrically powered regulating bootstrap system 420 utilizes a three-way regulating valve 422 instead of check valves 280a and 280b and orifices 27 and 282 to select the "lower" valued one of the output pressures provided by the four-way control valve. The lower valued output pressure is applied directly to pressure transducer 286. Control of electrically powered regulating bootstrap system 420 is substantially identical to that of electrically powered regulating bootstrap system 272 as described hereinabove.

Figure 18:
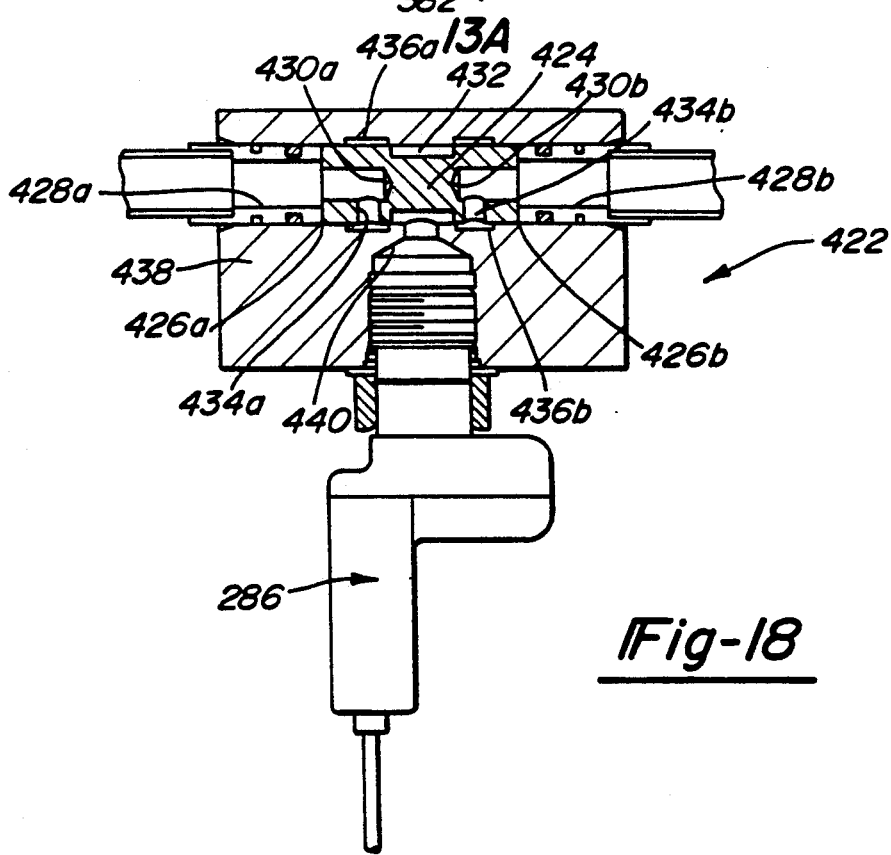
FIG. 18 is a sectional view of a three-way valve of the type adapted for use in the electrically controlled bootstrap system of FIG. 17 for selecting the "lower" valued one of two output pressures delivered by the four-way control valve.

With reference now to FIG. 18, there is presented a partial sectional view of a suitable construction for three-way valve 422. In operation, a valve spool 424 is diverted between first or second positions 426a and 426b, respectively, in order to fluidically couple either of first or second input ports 428a and 428b, respectively, having the "lower" valued one of the output pressures provided by the four-way control valve to pressure transducer 286. This is accomplished by applying differential pressure between first and second control ends 430a and 430b, respectively, of valve spool 424 via first and second input ports 428a and 428b, respectively, in order to move valve spool 424 to the first or second position 426a and 426b, respectively, having the lower pressure. Thereafter, the one of first or second input ports 428a and 428b, respectively, having the lower pressure is coupled to a groove 432 formed in valve spool 424 via the appropriate one of first and second passages 434a and 434b, respectively, formed in valve spool 424 and first and second input grooves 436a and 436b, respectively, formed in housing 438. Thereafter, the lower valued one of the output pressures provided by closed-centered four-way control valve 20 or open-center four-way control valve 350 is conveyed to pressure transducer 286 via an output port 440 formed in housing 438.

Shuttling ball valve 402 or three-way valve 442, can be accommodated within a valve body modified similarly to the manner in which orifices 27 and 302 and check valves 280a and 280b were accommodated within valve body 306. As an example, control valve apparatus 460, shown in FIGS. 19A and 19B, comprises any of the previously depicted valving sub-assemblies suitable for use with a shuttling ball valve 402'. Vertically oriented bore 462 enters first output groove 128a and its opposite end is in hydraulic communication with seat 464a via passage 466. Vertically oriented hole 468 enters second output groove 128b and its opposite end is in hydraulic communication with seat 464b formed in blind fitting 470 via passage 472. Furthermore, a horizontally oriented port 474 is in hydraulic communication with a chamber 476 surrounding ball 478 via one or more of a plurality of holes 480 formed in end 482 of blind fitting 470. As before, fluid in passages 466 or 472 having the "higher" valued pressure acts to force ball 478 into sealed engagement with the other respective one of seats 464a or 464b. Thereafter, the higher valued pressure is conveyed through at least one of holes 480 and port 474 to a pressure regulating valve assembly having a single input control port or to power steering pumps 406.

Figure 20:
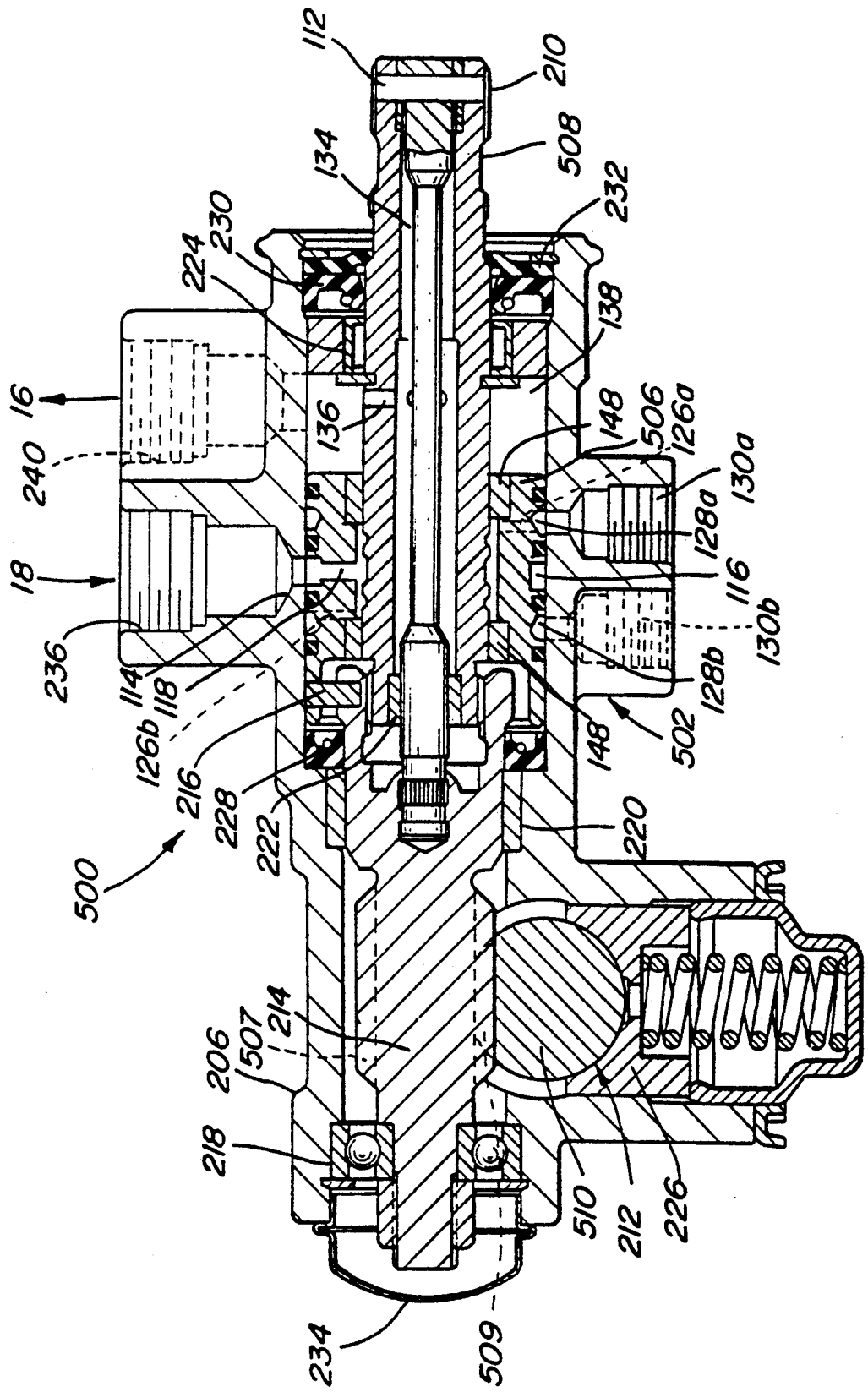
FIG. 20 is a sectional view of vehicular power steering control apparatus having an improved "closed-center" four-way control valve and which is adapted for use with the bootstrap power steering control systems of the present invention.

With particular reference now to FIGS. 20 and 21, another embodiment of a vehicular power steering control apparatus 500 is disclosed which is adapted for use with the bootstrap power steering systems of the present invention. For purposes of clarity, like numbers are used to designate like components previously described.

With particular reference to FIG. 20, power steering control apparatus 500 is shown to include an improved "closed-center" four-way control valve 502. More specifically, secured within valve chamber 138 is a valving sub-assembly 504 having a valve sleeve 506 and a valve spool 508 received therein, and which are rotatable with respect to each other about the axis of pinion shaft 214. The rotational position of valve sleeve 506 is substantially coupled to the translational position of pinion shaft 214 via drive pin 216. Gear teeth 507 formed on pinion shaft 214 are meshed with teeth 509 of a rack shaft 510 operably associated with piston-rack assembly 212. As is known, the opposite ends of rack shaft 510 are operably connected to the host vehicles' dirigible wheel assemblies via suitable steering linkage mechanisms in a conventional manner. As is schematically shown in FIG. 21, rack shaft 510 is operably connected to a piston 512 that is movable within a power cylinder 514 of piston rack assembly 212.

With particular reference now to FIGS. 21 and 22, valving sub-assembly 504 of "closed-center" control valve 502 is shown in greater detail. More particularly, valve sleeve 506 is shown to include a plurality of axially extending valve slots 520 formed circumferentially about its inner surface at equally spaced intervals thus defining lands 522 between adjacent valve slots 520. For clarity purposes, the alternating slots are hereinafter referred to as first and second valve slots 520a and 520b, respectively, while the alternating lands are hereinafter referred to as first and second lands 522a and 522b, respectively. Supply or input ports 118 are formed through first lands 522a which fluidly communicate with pump port 236 formed in valve housing 206 via annular groove 116 formed in the exterior surface of valve sleeve 506. In addition, first and second output ports 126a and 126b, respectively, are formed in valve sleeve 506 and open at the bottoms of first and second valve slots 520a and 520b, respectively, and communicate with load lines 22a and 22b, respectively. Output ports 126a and 126b are in fluid communication with left and right chambers 514a and 514b, respectively, of power cylinder 514 via load lines 22a and 22b, respectively. More specifically, output ports 126a and 126b are fluidically coupled to their respective load lines 22a and 22b via annular output grooves 128a and 128b, respectively, and distribution ports 130a and 130b, respectively, formed in valve housing 206.

The circumferential exterior surface of valve spool 508 is formed with a plurality of equally spaced inlet slots 524 which angularly correspond to input ports 118 formed through first lands 522a of valve sleeve 506. In addition, valve spool 508 is also formed to include an identical plurality of equally spaced return slots 526 which are aligned in an alternating relationship relative to inlet slots 524 and are angularly aligned with second lands 522b. Exhaust ports 132 provide fluid communication between return slots 526 and chamber 134 for permitting the returning load flow to be delivered to reservoir 16 in the previously described manner.

Control valve 502 is constructed as a "closed-center" control valve such that hydraulic fluid entering control valve 502 via input ports 118 is substantially "blocked" when valve spool 508 is rotationally centered relative to valve sleeve 506. Upon valve spool 508 being tangentially rotated in a first direction (i.e., clockwise in FIG. 21) against the torsional resistance provided by torsion bar 110', inlet orifices are generated between inlet slots 524 and second valve slots 520b for delivering load flow to output ports 126b and, in turn, cylinder chamber 514b via load line 22b. Simultaneously, return orifices are generated between those first valve slots 520a and return slots 526 for returning load flow from cylinder chamber 514a, load line 22a and output ports 126a to reservoir 16 via exhaust ports 132. As will be appreciated by those skilled in the art, rotation of valve spool 508 in an opposite direction (i.e., counterclockwise in FIG. 21) against the torsional resistance of torion bar 110' causes the hydraulic fluid to flow in an opposite manner from that explained above. As such, load flow would be delivered from inlet slots 524 to first valve slots 520a and output ports 126a to load line 22a while returning load flow from load line 22b would enter through output ports 126b and second valve slots 520b to return slots 526 and exhaust ports 132.

As seen in FIG. 21, inlet slots 524 and return slots 526 are formed such that the inlet and return orifices begin to "open" substantially simultaneously with rotation of valve spool 508 from the "centered" position shown, such that control valve 502 is referred to as a "zero-lapped" four-way control valve. However, it is also contemplated that inlet slots 524 and return slots 526 may be formed to "open" their respective orifices only after a preselected amount of rotation of valve spool 508 has occurred, whereby control valve 502 would be considered an "over-lapped" four-way control valve.

With continued reference to FIGS. 21 and 22, a first preferred embodiment of improved valving sub-assembly 504 is shown. In general, valving sub-assembly 504 is constructed to provide a parasitic leakage flow path between output ports 126a and 126b when valve spool 508 is in its "centered" position. The parasitic leakage flow path eliminates a "dead-headed" condition that otherwise would prevent translational motion of piston-rack assembly 212 in the "centered" position. In addition, valving sub-assembly 504 functions as a hydraulic damping device, much like a shock absorber, such that regulation of the size of the leakage orifices effectively controls the rate of leakage (i.e., the resistance to flow) between output ports 126a and 126b as a function of the tangential motion of valve spool 508. Moreover, the parasitic flow values, which are required to accommodate differing supply and load flow values associated with normal operation of power steering control apparatus 500, are by-passed through the parasitic leakage flow path in order to generate steering force vs. applied torque characteristic curves as depicted in FIGS. 24A, 24B, 24C and 25.

In accordance with the present invention, the parasitic leakage flow path is provided by leakage slots 530 formed in valve spool 508 and which are arranged to generate leakage orifices 532a and 532b between leakage slots 530 and valve slots 520a and 520b, respectively. However, while the drawings illustrate leakage slots 530 formed in parallel with inlet slots 524, it will be appreciated that leakage slots 530 could likewise be formed in parallel with return slots 526 alone or in various combinations with leakage slots 530 formed in parallel with inlet slots 524.

With reference to FIG. 23A in view of FIGS. 21 and 22, a first preferred construction of leakage slots 530 is shown in greater detail. Leakage slots 530 are parallel to inlet slots 524 (or return slots 526) and symmetrical about an axial center line 534 thereof. As can be seen, when valve spool 508 is rotationally "centered" relative to valve sleeve 506, only parasitic leakage flow is permitted between output ports 126a and 126b with the primary supply flow through input ports 118 being "blocked". In the "centered" condition, leakage orifices 532a and 532b are substantially equally sized relative to adjacent first and second valve slots 520a and 520b, respectively. As previously described, the application of steering torque to input portion 210 of valve spool 508 in a first direction (clockwise in FIG. 21) causes tangential rotation of valve spool 508 in opposition to the torsional resistance of torsion bar 110'. Such rotation of valve spool 508 causes inlet orifices to open between the laterally aligned edges of inlet slots 524 and valve slots 520b while continuing to inhibit (i.e., "block") flow between the opposite laterally aligned edges of inlet slots 524 and valve slots 520a. Concurrently, return orifices are opened between the laterally aligned edges of return slots 526 and valve slots 520a while continuing to inhibit (i.e., "block") fluid communication between valve slots 520b and return slots 526. In this manner, load flow returning through output port 126a is exhausted to reservoir 16 in the manner previously disclosed.

Leakage slots 530 are oriented and sized such that the degree of rotation of valve spool 508 regulates the size of leakage orifices 532a and 532b for selectively metering the leakage flow across inlet slots 524. During clockwise relative motion of valve spool 508, leakage orifices 532a are reduced in size while leakage orifices 532b are increased in size. Therefore, the leakage "rate" selectively varies as a function of the relative rotation between valve spool 508 and valve sleeve 506 (as well as the square root of the load pressure) whereby the smaller leakage orifices 532a become the dominant leakage flow restriction. Eventually, leakage orifices 532a become completely "blocked-off" and leakage flow ceases at typical rotation values in the order of about 2.5°. Such rotation values are often selected to match inlet and return orifice opening values whereat maximum values of load flow are accommodated. As is obvious to those skilled in the art, opposite (i.e., counterclockwise) rotation has a similar result except that leakage orifices 532b become the dominant leakage flow restriction and steering effort is oppositely directed. Any further opening of the inlet and return orifices results in all supply flow being applied directly to power cylinder 514 according to characteristics generated by the specific configuration of the inlet and return orifices. As previously disclosed, the specific configuration of the inlet and return orifices can be developed via modifying the slot contours as taught by the present invention. Similarly, while leakage slots 530 are shown to be configured such that leakage orifices 532a and 532b are generally rectangular, it will be appreciated that the specific orifice profile can be modified without departing from the scope of the present invention.

With particular reference now to FIG. 23B, an alternative embodiment for a non-symmetrical set of leakage slots 530a and 530b is schematically shown. Again, leakage slots 530a and 530b are shown in parallel with inlet slots 524 (or return slots 526). However, leakage slots 530a and 530b are shown coupled to first and second valve slots 520a and 520b by small leakage orifices 533a and 533b, respectively, and large leakage orifices 535a and 535b, respectively. Utilizing non-symmetrical leakage orifices (relative to axial center line 534) results in a sequential "blocking" of either of leakage slots 530a and 530b depending upon the direction of relative rotation.

With particular reference now to FIG. 23C, a valving sub-assembly is shown configured similarly to that shown in FIG. 23A except that it is depicted as an "over-lapped" valving sub-assembly. In such an "over-lapped" valving sub-assembly, a predetermined amount of rotation of valve spool 508 is required prior to the inlet and return orifices being generated between inlet and return slot 524 and 526, respectively, and the appropriate valve slots 520a and 520b. As is obvious to one skilled in the art, the features depicted in FIGS. 23B and 23C may be combined in order to achieve greater design freedom in selecting a particular set of characteristic steering force vs. applied torque curves such as those depicted in FIG. 25.

Figure 24A:
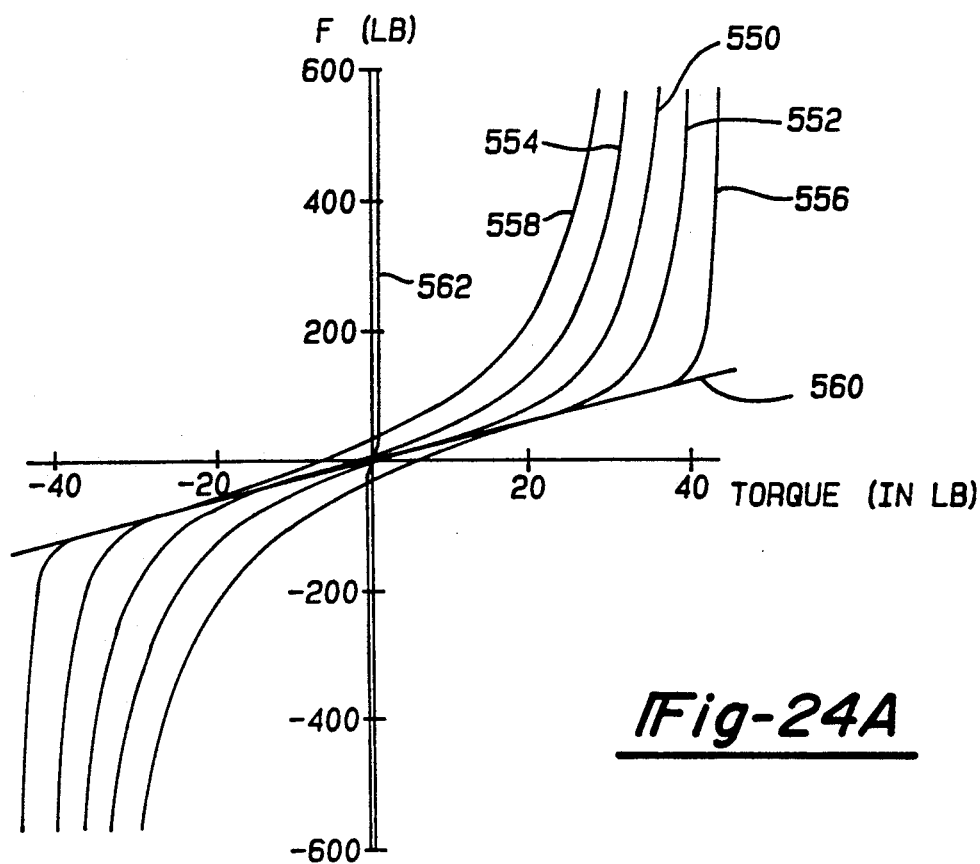
FIGS. 24A through 24C graphically illustrate exemplary relationships between applied steering torque (T) and the resulting steering force (F) for the improved valving sub-assembly having symmetrical leakage slots wherein the inlet and return slots formed in the valve spool have zero "over-lap", slight "over-lap" and large "over-lap", respectively, with respect to the valve sleeve slots.
Figure 24B:
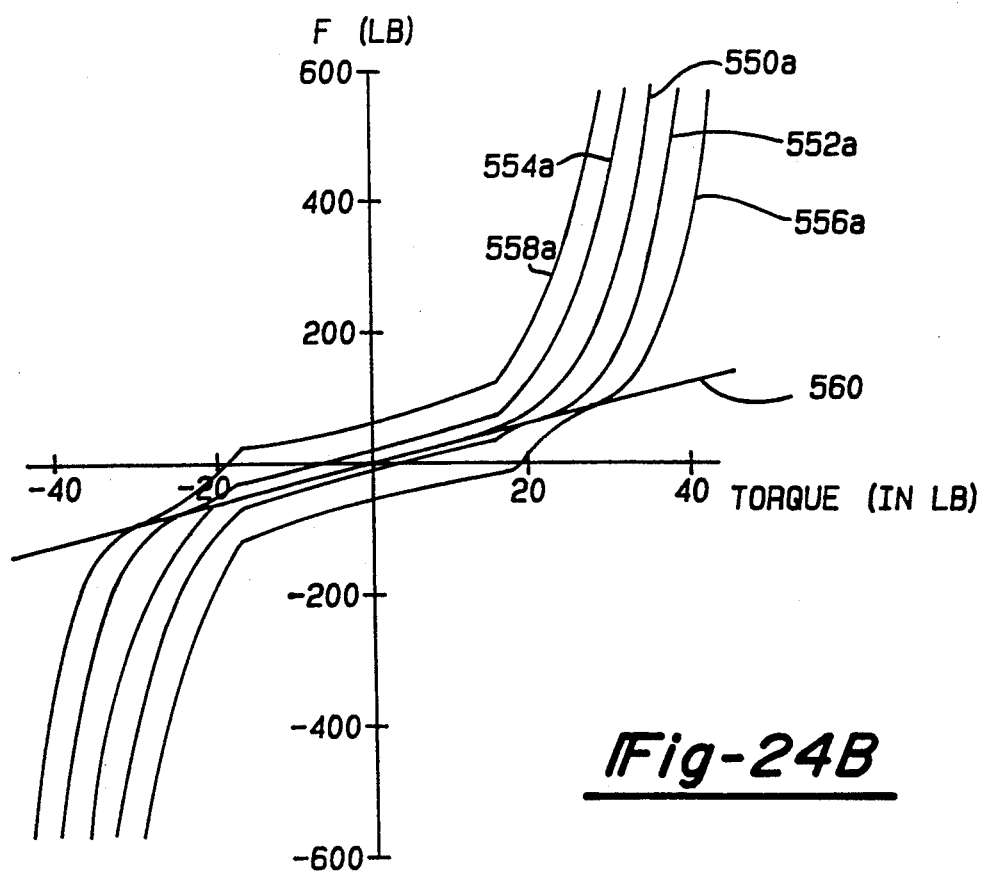
Figure 24C:
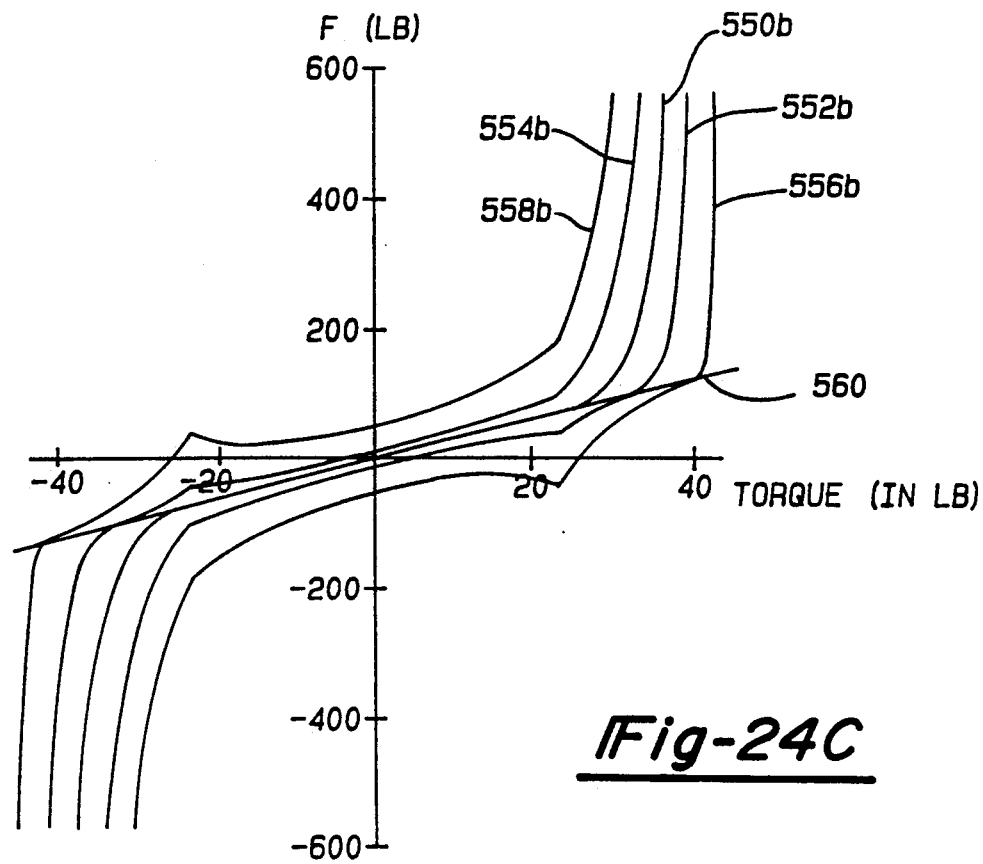

With particular reference now to FIGS. 24A, 24B and 24C, exemplary graphs are provided which depict the relationship between applied steering torque (T) and the resulting steering force (F) for a power steering system equipped with control valve 502 having valving sub-assembly 504 with "symmetrical" leakage slots 530, and wherein inlet slots 524 and return slots 526 have zero "over-lap", a slight "over-lap" and a large "over-lap", respectively, with respect to valve slots 520a and 520b. In addition, each graph is shown at various rates of applied steering rotational velocity with the "rate" curves being representative of differing revolutions of the steering wheel per second (rev/sec). Accordingly, in FIG. 24A curve 550 equals zero (rev/sec); curve 552 and 554 equal +/−1.0 (rev/sec); and curves 556 and 558 equal +/− 2.0 (rev/sec), respectively, for a zero "over-lap" valving sub-assembly. Likewise, curves 550a through 558a of FIG. 24B are indicative of a slightly "over-lapped" valving sub-assembly, while curves 550b through 558b of FIG. 24C represent the characteristics of a valving subassembly with a larger "over-lapped" configuration. The manual steering component associated with the deflection of torsion bar 110' is independently depicted by plotted line 560. In addition, the characteristic curve for a conventional closed-center rotary valve is plotted as curve 562 for comparative purposes. As can be seen in FIG. 24A, a true closed-center control valve generates substantially infinite pressure gain immediately upon opening the inlet and return orifices in response to slight rotation of the valve spool.

Utilization of "closed-center" four-way control valve 502 having leakage slots 530 is highly desirable for use in electrically powered motor vehicle power steering systems, such as shown in FIGS. 10, 11 and 17, since the applied torque (T) versus steering force (F) characteristic curves associated with closed-centered valves can be effectively modified to "simulate" the characteristic typically associated with open-centered control valves while concomitantly preserving the significant power consumption advantages closed-centered valves provide (i.e., the significantly reduced supply flow requirements). In short, the parasitic leakage provided by leakage slots 530 simply allows closed-centered control valve 502 to function more or less in a open-centered manner.

Figure 25:
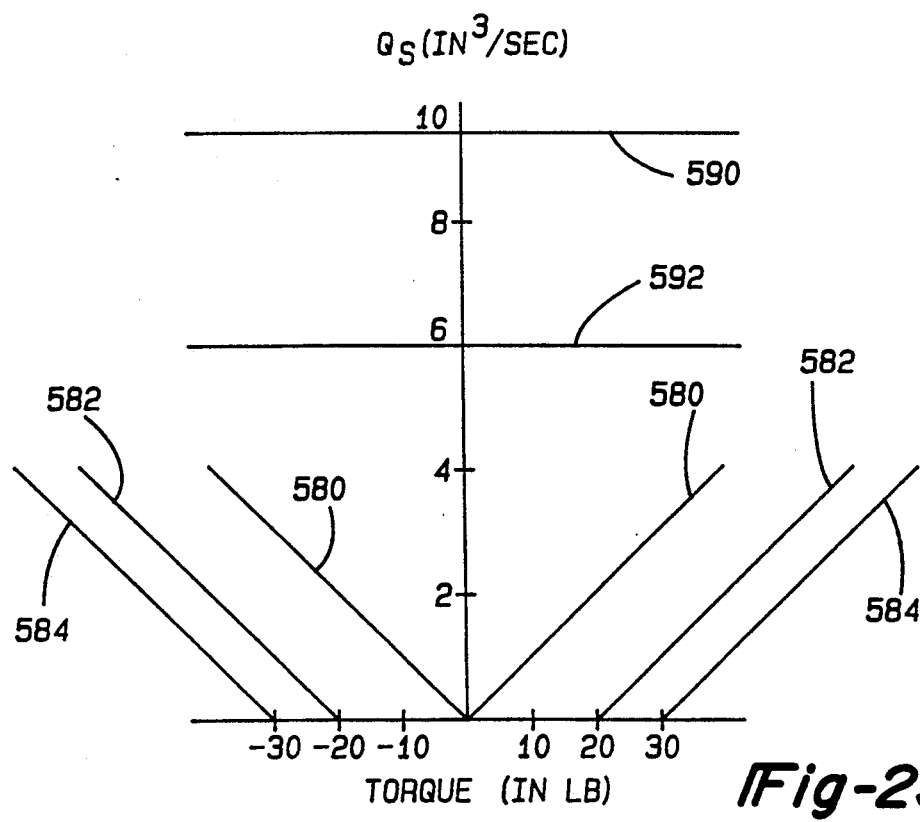
FIG. 25 graphically illustrates an exemplary plot of supply flow ($Q_s$) versus input torque (T) for electrically controlled bootstrap power steering systems using the improved "closed-center" control valve and a conventional rotary valve equipped power steering system.

With reference now to FIG. 25, exemplary graphs are presented which further illustrate the significant performance advantages associated with using closed-center control valve 502 in the electrically controlled bootstrap power steering systems of the present invention. In general, the plots are indicative of the relationship between supply flow ($Q_s$) and input torque (T) applied to valve spool 508. More particularly, symmetrical lines 580 are indicative of this relationship for a closed-center control valve 502 having a "zero-lapped" valving sub-assembly such that supply flow $Q_s$ is linearly related to input torque (T). As can be seen, supply flow is generated in response to "opening" of the inlet and return orifices upon initial tangential movement of valve spool 508 from its closed-centered position. Likewise, symmetrical lines 582 and 584 are indicative of the relationships associated with closed-center control valve 502 having slightly "over-lapped" and larger "over-lapped" valving configurations, respectively, the characteristic curves of which are shown in FIGS. 24B and 24C, respectively.

With continued reference to FIG. 25, power steering systems using the various valving constructions for closed-center control valve 502 are shown to be substantially more efficient in terms of power consumption than conventional power steering systems having valving sub-assemblies that actually consume all the fluid flow as depicted by lines 590 and 592. As is known, open-center control valves associated with most conventional power steering systems typically utilize supply flow varying between 6 (in $^3$/sec) and 10 (in $^3$/sec). As such, use of closed-center control valve 502 is advantageous in that it generates performance characteristics (See FIGS. 24A through 24C) nominally duplicating desirable open-center characteristics while concomitantly preserving the significant power consumption advantages associated with closed-center control valves.

Figure 26:
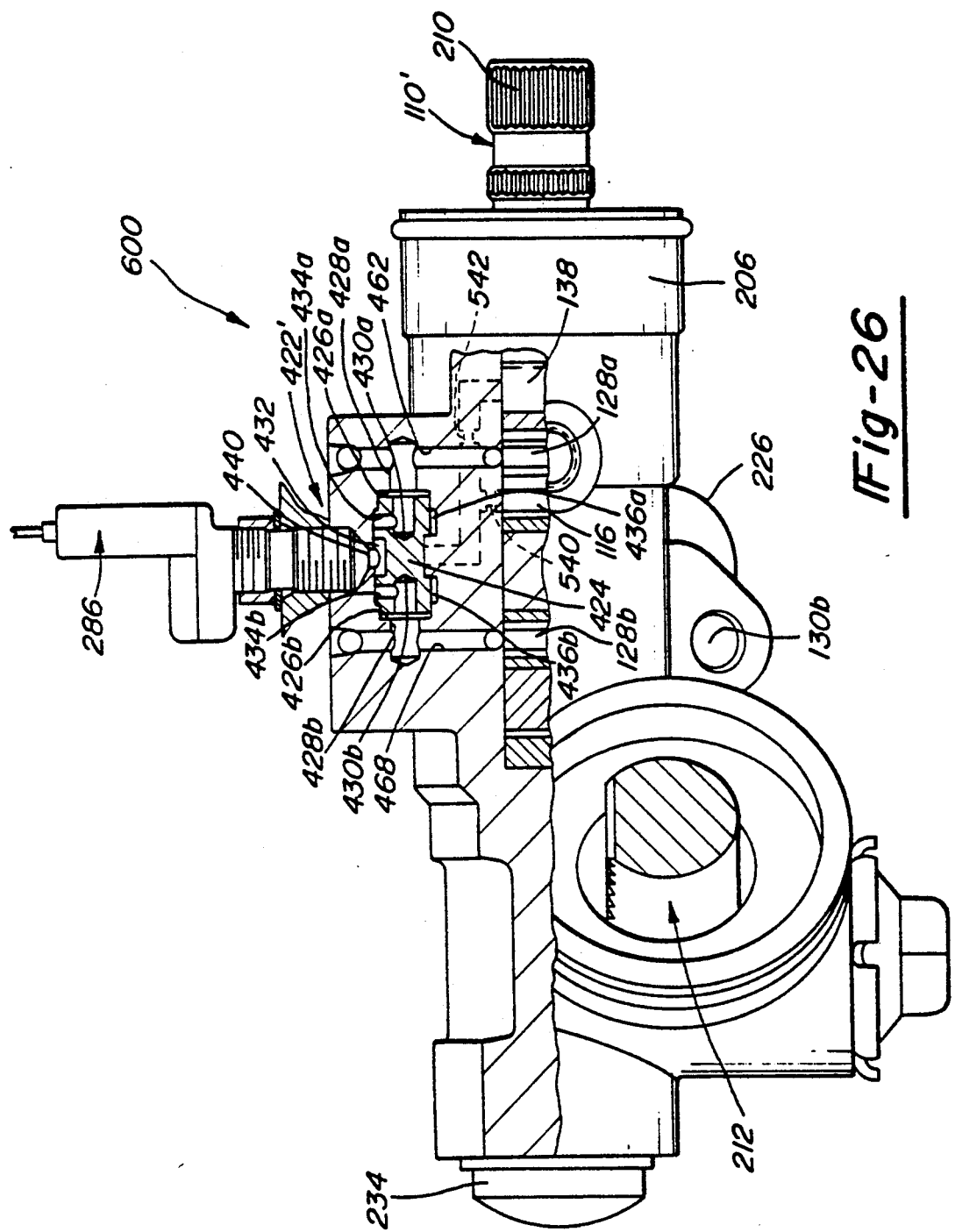
FIG. 26 is a sectional view of a power steering control apparatus, similar to the control apparatus shown in FIG. 22, that is particularly well-suited for use with the electrically controlled bootstrap system shown in FIG. 17.

With reference now to FIG. 26, a power steering control apparatus 600 is shown that is particularly well-suited for use with the electrically controlled bootstrap power steering system shown in FIG. 17. More particularly, power steering control apparatus 600 is similar to control apparatus 500 shown in FIG. 22 that has been modified to include a three-way valve 422' operable for selecting the "lower" valued one of two output pressures delivered by four-way control valve 502. In general, the structure and function of three-way valve 422' is substantially identical to three-way valve 422 shown in FIG. 18. As seen, vertically oriented bore 462 communicates with first output groove 128a and vertically oriented bore 468 communicates with second output groove 128b. Valve spool 424 is diverted between first and second positions 426a and 426b, respectively, in order to fluidically couple either of first and second output grooves 128a and 128b, respectively, having the "lower" valued one of the output pressures provided by four-way control valve 502 to pressure transducer 286. This is accomplished by applying differential pressure between first and second control ends 430a and 430b, respectively, of valve spool 424 via first and second input ports 428a and 428b, respectively, in order to move valve spool 424 to the first or second position 426a and 426b, respectively, having the lower pressure. Thereafter, the one of first or second input ports 428a and 428b, respectively, having the lower pressure is coupled to a groove 432 formed in valve spool 424 via the appropriate one of first and second passages 434a and 434b, respectively, formed in valve spool 424 and first and second input grooves 436a and 436b, respectively, formed in housing 206. Thereafter, the lower valued one of the output pressures provided by closed-centered four-way control valve 502 is conveyed to pressure transducer 286 via an output port 440.

In addition to the above, a pressure dividing network comprising substantially equally valued small control orifices 540 and 542 can be utilized to set the pressure in groove 432 at a value that is substantially equal to half of the supply pressure whenever no input torque is applied to valve spool 508 such that first and second valve slots 520a and 520b, respectively, are effectively decoupled from inlet slots 524 and return slots 526. These supplemental control orifices 540 and 542 effectively remove the necessity for balancing leakage flow between inlet slots 524 and first and second valve slots 520a and 520b, respectively, and return slots 526 in order to establish the pressure in groove 432 at a value that is substantially equal to half of the supply pressure whenever no input torque is applied to valve spool 508. As can be seen in FIG. 26, orifice 540 resistively couples fluid in groove 432 to input groove 116 while orifice 542 resistively couples fluid in groove 432 to chamber 138.

Figure 27:
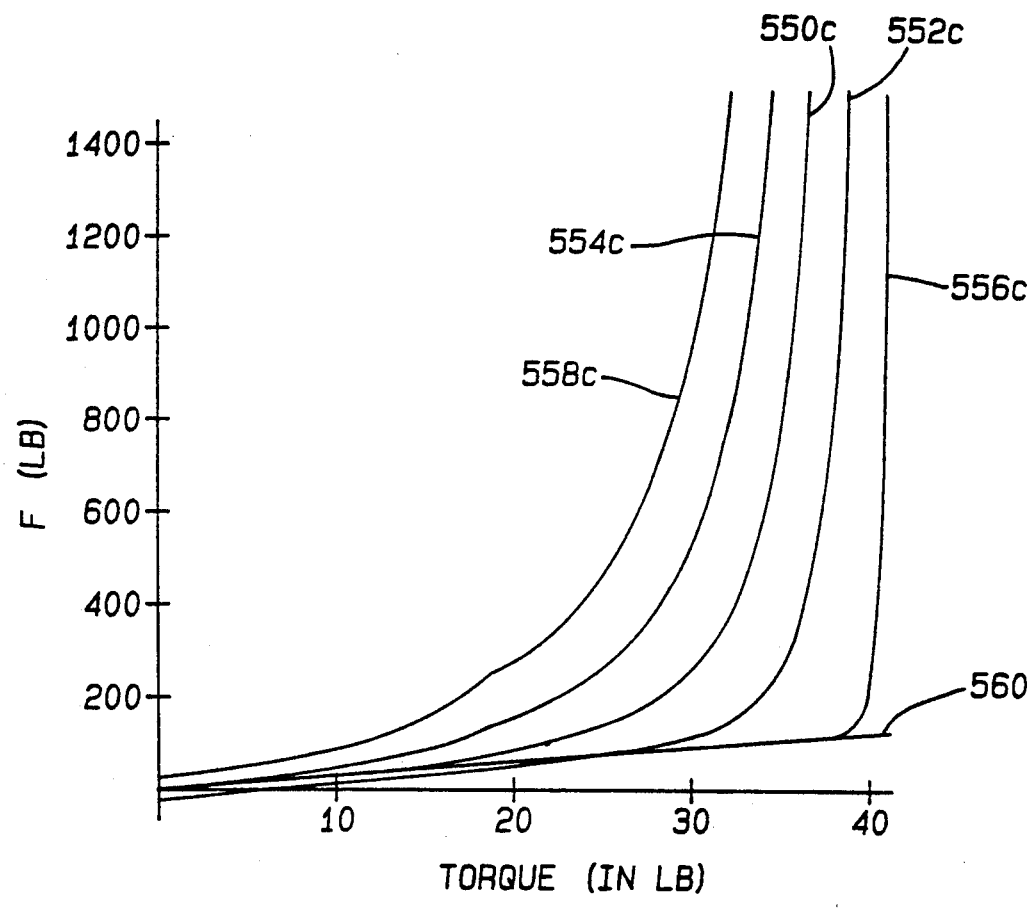
FIG. 27 is an exemplary graph, similar to FIGS. 24A through 24C, for an improved valving sub-assembly having over-lapped slots and non-symmetrical leakage slots.

With reference now to FIG. 27, an exemplary graph is provided for illustrating the relationship between applied steering torque (T) and the resulting steering force (F) for a power steering system equipped with an "over-lapped" valving subassembly 504 having non-symmetrical leakage slots 530a and 530b plotted at various rates of applied steering rotational velocity. Again, the various "rate" curves are representative of differing revolutions of the steering wheel per second (rev/sec) wherein curve 550c equals zero (rev/sec); curves 552c and 554c equal +/−1.0 (rev/sec); and curves 556c and 558c equal +/−2.0 (rev/sec), respectively. The manual steering component associated with the deflection of torsion bar 110' is independently depicted by plotted line 560. While only first quadrant plots are shown, it will be appreciated that the curves are symmetrical in the third quadrant in the manner clearly shown in FIGS. 24A through 24C. As can be seen, a set of characteristic curves can be obtained wherein virtual "manual steering" is obtained at low values of input torque (depicted in FIG. 27 between values of −5 to +5 inch pounds). This effect is commonly known in the industry as "hydraulically generated preload", and in the opinion of some in the industry, results in superior "on-center feel". Hydraulically generated preload is usually obtained by a complex arrangement of slots in an otherwise standard rotary valve. One significantly different operational characteristic of a power steering system having valving sub-assembly 504 with a combination of "over-lapped" inlet slots 524 and return slots 526, and non-symmetrical leakage slots 530a and 530b is the significant lateral spreading of the curves representing various rotational turning rates of the steering wheel. This means that increased levels of torque modulation are concomitant with the various turning rates and results in increased steering stability similar to having a large shock absorber placed in parallel with the power cylinder-rack assembly 214.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:
1. A method of providing tactile feedback for a power steering system in response to rotational inputs applied to a steering wheel, said method comprising the steps of:
   providing a source of hydraulic fluid;
   providing means for receiving said rotational inputs, said receiving means including a closed-center control valve assembly having a valve spool and a valve sleeve that are rotatable and resiliently coupled with respect to each other from a centered position in response to said rotational inputs, said sleeve having at least one inlet port;
   supplying said hydraulic fluid to said at least one inlet port of said closed-center control valve assembly;
   providing fluid communication between first and second output ports of said closed-center control valve assembly and first and second ports of a power output transducer, respectively;
   controlling a different output pressure applied to said first and second ports of said power output transducer and a differential output fluid flow therebetween in response to said rotational inputs, said differential output pressure defining a load pressure;
   providing leakage flow path between said first and second putput ports adjacent each said at least one inlet port of said closed-center control valve assembly;
   communicating a leakage flow in said flow path between said first and second output ports when said control valve is in a center position; and
   generating said tactile feedback as a function of both of said differential output pressure and said differential output fluid flow passing through said control valve assembly.
2. The method of claim 1 wherein said valve sleeve has output slots formed therein which are in fluid communication with said first and second output ports, said valve spool having input and return slots for defining control orifices with respect to said output slots in response to valve deflection between said valve spool and said sleeve for regulating the passage of fluid between said input and return slots and said output slots, and wherein said step of providing a leakage flow path comprises forming leakage orifices with respect to leakage slots in said valve spool that are in fluid communication with said valve sleeve output slots and which function to regulate said leakage flow therebetween as a function of said valve deflection.

3. The method of claim 2 wherein said leakage slots are parallel to at least one of said input and return slots and are symmetrical with respect to a center line thereof.

4. The method of claim 2 wherein said leakage slots are non-symmetrical with respect to said input and return slots.

5. The method of claim 2 wherein said rotational inputs comprise both input torque and rotational velocity as applied to said steering wheel such that said tactile feedback is substantially equal in value to said input torque.

6. A hydro-mechanical control system for a motor vehicle power steering system operable to selectively control the flow of hydraulic fluid to first and second input ports of a power output transducer for controlling the positioning of a mechanical device in response to rotational input applied to a steering wheel by a vehicle operator, said hydro-mechanical control system comprising:

a fluid reservoir;

a closed-center control valve assembly having at least one inlet port, a return port and first and second output ports, said control valve assembly further including a valve sleeve selectively rotatable within a valve housing, a valve spool selectably rotatable within a central bore of said valve sleeve, and leakage means for generating a fluid leakage flow path between said first and second output ports adjacent each said at least one outlet port;

pump means in fluid communication with said reservoir and operable for providing hydraulic fluid to said inlet port of said control valve assembly;

supply line means for delivering said pressurized hydraulic fluid from said pump means to said inlet port of said control valve assembly;

return line means for fluidly interconnecting said control valve return port to said fluid reservoir; and first and second load lines fluidly interconnecting said first and second output ports of said control valve assembly with said first and second input ports of said power output transducer respectively, said control valve assembly being operable to control a differential output pressure applied to said first and second ports of said power output transducer and a differential output fluid flow therebetween in response to said rotational inputs, said differential output pressure defining a load pressure;

said hydro-mechanical control system being operable for generating tactile feedback as a function of said differential output pressure and said differential fluid flow passing through said control valve assembly.

7. The hydro-mechanical control system of claim 6 wherein said valve spool includes a plurality of alternating inlet and return slots formed therein, said valve sleeve including first and second output slots in fluid communication with said first and second output ports, respectively, said control valve assembly forming control orifices between said inlet and return slots and said first and second output slots which are configured to vary in size as a function of relative rotation between said valve spool and said valve sleeve, and wherein said control orifices are closed when said valve spool is in said centered position such that only said parasitic leakage flow between said first and second output slots is permitted.

8. The hydro-mechanical control system of claim 7 wherein said leakage means includes leakage slots formed in said valve spool that function to generate first and second leakage orifices between said leakage slots and said output slots in said valve sleeve.

9. The hydro-mechanical control system of claim 8 wherein said leakage slots are symmetrical with respect to said inlet slots.

10. The hydro-mechanical control system of claim 8 wherein said leakage slots are symmetrical with respect to said return slots.

11. The hydro-mechanical control system of claim 8 wherein said leakage slots regulate leakage flow across said output ports of said control valve assembly as a function of tangential motion of said valve spool with respect to said valve sleeve.

12. The hydro-mechanical control system of claim 8 wherein said leakage slots are unsymmetrical with respect to said inlet slots or said return slots such that a first set of leakage slots form small leakage orifices with said first output slots and large leakage orifices with said second output slots, and a second set of leakage slots form small leakage orifices with said second output slots and large leakage orifices with said first output slots.

13. An electro-hydro-mechanical control system for a motor vehicle power steering operable to selectively control the flow of hydraulic fluid to first and second input ports of a power output transducer for controlling the positioning of a mechanical device, said electro-hydro-mechanical control system comprising:

a fluid reservoir;

pump means in fluid communication with said reservoir;

actuation means controllably driving said pump means for providing hydraulic fluid at a regulated fluid pressure;

a closed-center control valve assembly having at least one inlet port, a return port and first and second output ports, said control valve assembly further including a valve sleeve selectively rotatable within a valve housing, a valve spool selectably rotatable within a central bore of said valve sleeve, and leakage means for generating a fluid leakage flow path between said first and second output ports adjacent each said at least one inlet port when said control valve is in a closed-center position;

supply line means for delivering said pressurized hydraulic fluid from said pump means to said inlet port of said control valve assembly;

return line means for fluidly interconnecting said control valve return port to said fluid reservoir;

first and second load lines fluidly interconnecting said first and second output ports of said control valve assembly with said first and second input ports of said power output transducer respectively, said control valve assembly being operable to control a differential output pressure applied to said first and second ports of said power output transducer and a differential output fluid flow therebetween in response to said rotational inputs, said differential output pressure defining a load pressure;

valve means in fluid communication with each of said first and second load lines for fluidically coupling the one of said first and second load lines having the lower valued fluid pressure to means for generating an electrical signal indicative of said lower valued fluid pressure; and controller means for receiving said electrical signal and actuating said actuation means in response thereto;

wherein said control system is operable for generating tactile feedback as a function of said differential output pressure and said differential fluid flow passing through said control valve assembly.

14. The electro-hydro-mechanical control system of claim 13 wherein said valve sleeve has output slots formed therein which are in fluid communication with said first and second output ports, said valve spool having input and return slots operable for defining control orifices with respect to said output slots in response to valve deflection between said valve spool and said valve sleeve for regulating the passage of fluid between said input and return slots and said output slots, and wherein said leakage means is in fluid communication with said valve sleeve output slots and function to regulate said leakage flow therebetween as a function of said valve deflection.

15. The electro-hydro-mechanical control system of claim 14 wherein said leakage means includes leakage slots formed in said valve spool that function to generate first and second leakage orifices between said leakage slots and said output slots in said valve sleeve.

16. The electro-hydro-mechanical control system of claim 15 wherein said leakage orifices are substantially equal in size relative to said valve sleeve output slots when said valve spool is in a centered position.

17. The electro-hydro-mechanical control system of claim 15 wherein said leakage slots regulate leakage flow across said output ports of said control valve assembly as a function of tangential motion of said valve spool with respect to said valve sleeve.

18. The hydro-mechanical control system of claim 15 wherein said leakage slots are unsymmetrical with respect to said inlet slots or said return slots such that a first set of leakage slots form small leakage orifices with said first output slots and large leakage orifices with said second output slots, and a second set of leakage slots form small leakage orifices with said second output slots and large leakage orifices with said first output slots.

19. A method of controlling the movement of a mechanical device in response to an external input, said method comprising the steps of:

providing a source of hydraulic fluid including pressure regulating means for regulating the pressure of said hydraulic fluid at a specified pressure;

providing means for receiving said external input, said receiving means including a closed center control valve;

supplying said hydraulic fluid to at least one inlet port of said closed center control valve;

providing fluid communication between first and second output ports of said closed center control valve assembly and first and second ports of a power output transducer, respectively, said power output transducer operable for causing said movement of said mechanical device;

controlling the output flow applied to said first and second ports of said power output transducer in response to said external inputs, said power output transducer concurrently causing a differential output pressure being a difference in fluid pressure between said first and second load lines for defining a load pressure;

generating a first signal indicative of said load pressure;

generating a second signal indicative of a preselected supplemental pressure; and applying said first and second signals to said pressure regulating means to define said specified pressure;

providing leakage flow path between said first and second putput ports adjacent each said at least one inlet port of said closed-center control valve;

permitting a leakage flow of said closed-center valve when said valve supply is in a centered position; and generating said tactile feedback as a function of said differential output pressure.

20. A method of providing tactile feedback for a control system for controlling the movement of a mechanical device in response to an external input, said method comprising the steps of:

providing an electrically driven source of hydraulic fluid for regulating the flow of said hydraulic fluid at a supply pressure and a specified flow rate;

providing means for receiving said external input, said receiving means including a closed center control valve;

supplying said hydraulic fluid to at least one inlet port of said closed center control valve;

providing fluid communication between first and second output ports of said closed center control valve assembly and first and second ports of a power output transducer, respectively, said power output transducer operable for causing said movement of said mechanical device;

controlling the output flow applied to said first and second ports of said power output transducer in response to said external inputs, said power output transducer concurrently causing a difference in fluid pressure between said first and second load lines for defining a load pressure;

generating a signal indicative of a difference between said supply pressure and said load pressure;

applying said signal to a control means of said electrically driven source of hydraulic fluid such that said signal is maintained at a preselected value;

providing leakage flow path between said first and second putput ports adjacent each said at least one inlet port of said closed-center control valve;

permitting a leakage flow in said flow path of said closed-center valve when said valve spool is in said centered position; and generating said tactile feedback as a function of said load pressure.

* * * * *